United States Patent
Kato et al.

(10) Patent No.: US 9,389,664 B2
(45) Date of Patent: *Jul. 12, 2016

(54) OPERATIONS MANAGEMENT METHODS AND DEVICES THEREOF IN SYSTEMS

(71) Applicant: Hitachi, Ltd., Tokyo (JP)

(72) Inventors: Takeshi Kato, Akishima (JP); Tadakatsu Nakajima, Kasumigaura (JP); Tatsuya Saito, Kunitachi (JP); Jun Okitsu, Kodaira (JP); Yoko Shiga, Yokohama (JP); Yoshio Miki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/843,099

(22) Filed: Sep. 2, 2015

(65) Prior Publication Data

US 2015/0378414 A1    Dec. 31, 2015

Related U.S. Application Data

(63) Continuation of application No. 12/352,166, filed on Jan. 12, 2009, now Pat. No. 9,128,704.

(30) Foreign Application Priority Data

Apr. 9, 2008  (JP) ................................ 2008-100927

(51) Int. Cl.
*G06F 1/28* (2006.01)
*G06F 1/20* (2006.01)
(Continued)

(52) U.S. Cl.
CPC .. *G06F 1/28* (2013.01); *G06F 1/20* (2013.01); *G06F 1/3203* (2013.01);
(Continued)

(58) Field of Classification Search
CPC .................. G05B 19/042; G05B 2219/25387; G05B 2219/2614; G05B 2219/2638; G06F 1/20; G06F 1/3203
See application file for complete search history.

(56) References Cited

U.S. PATENT DOCUMENTS 6,795,928 B2 * 9/2004 Bradley ............... G06F 1/206
700/22
7,134,011 B2 * 11/2006 Fung ................... G06F 1/3203
709/221

(Continued)

FOREIGN PATENT DOCUMENTS

| JP | 11-296488 A | 10/1999 |
| JP | 2004-126968 | 4/2004 |
| JP | 2007-179437 | 7/2007 |

*Primary Examiner* — Backhean Tiv
(74) *Attorney, Agent, or Firm* — Mattingly & Malur, PC

(57) ABSTRACT

Total power consumption of information-processing devices and power supply/cooling facilities is reduced to realize energy saving operation of information-processing system. The information-processing system includes information-processing devices, power supply facilities, cooling facilities and an operations management device. The operations management device is connected to the devices and the facilities and includes layout information constituted of locations and operating information of the devices and locations and environmental information of the facilities. Also, the operations management device obtains the power consumption of the devices, the power supply loss of the power supply facilities and the cooling power of the cooling facilities by using the layout information, and then allocates the workloads to the devices so as to reduce the total sum of power consumption, supply loss and cooling power.

9 Claims, 12 Drawing Sheets

(51) Int. Cl.
*G06F 1/32* (2006.01)
*G05B 19/042* (2006.01)

(52) U.S. Cl.
CPC .... *G05B 19/042* (2013.01); *G05B 2219/25387* (2013.01); *G05B 2219/2614* (2013.01); *G05B 2219/2638* (2013.01); *Y02B 60/142* (2013.01); *Y02B 60/167* (2013.01)

(56) References Cited

U.S. PATENT DOCUMENTS

| | | | |
|---|---|---|---|
| 7,197,433 B2 | 3/2007 | Patel et al. | |
| 7,203,846 B2* | 4/2007 | Bresniker | G06F 1/3203 710/15 |
| 7,325,050 B2* | 1/2008 | O'Connor | G06F 1/263 709/223 |
| 7,373,268 B1* | 5/2008 | Viredaz | G06F 1/3203 702/130 |
| 7,406,365 B2* | 7/2008 | Pratt | H02J 1/14 700/22 |
| 7,447,920 B2* | 11/2008 | Sharma | G06F 9/505 709/223 |
| 7,472,558 B1* | 1/2009 | Narita | F24F 11/0009 165/104.33 |
| 7,516,221 B2* | 4/2009 | Souder | G06F 9/5027 709/226 |
| 7,619,868 B2* | 11/2009 | Spitaels | H01R 25/003 361/115 |
| 7,724,518 B1* | 5/2010 | Carlson | G06F 1/189 165/104.33 |
| 7,792,597 B2* | 9/2010 | Brey | G06F 1/206 700/299 |
| 7,865,272 B2* | 1/2011 | Spitaels | H02J 3/14 700/299 |
| 7,970,903 B2* | 6/2011 | Oeda | G06F 9/4856 709/226 |
| 7,991,515 B2* | 8/2011 | Lyon | G06F 1/206 700/300 |
| 7,991,588 B1* | 8/2011 | Krieger | G06F 1/26 702/186 |
| 8,053,926 B2* | 11/2011 | Lehmann | G06F 1/26 307/64 |
| 8,155,793 B2* | 4/2012 | Nakajima | G05B 19/042 700/276 |
| 9,128,704 B2* | 9/2015 | Kato | G06F 1/20 |
| 2003/0046339 A1* | 3/2003 | Ip | H04L 41/12 709/203 |
| 2003/0115000 A1* | 6/2003 | Bodas | G06F 1/26 702/60 |
| 2004/0163001 A1* | 8/2004 | Bodas | G06F 1/206 713/300 |
| 2005/0060590 A1* | 3/2005 | Bradley | G06F 9/5077 713/320 |
| 2005/0228618 A1* | 10/2005 | Patel | G06F 9/505 702/188 |
| 2006/0248324 A1* | 11/2006 | Fung | G06F 1/3203 713/1 |
| 2006/0259621 A1 | 11/2006 | Ranganathan et al. | |
| 2006/0259622 A1* | 11/2006 | Moore | G06F 9/505 709/226 |
| 2006/0259793 A1 | 11/2006 | Moore et al. | |
| 2007/0038414 A1* | 2/2007 | Rasmussen | G06F 1/206 703/1 |
| 2007/0078635 A1* | 4/2007 | Rasmussen | G06F 1/20 703/1 |
| 2007/0094527 A1* | 4/2007 | Frietsch | G06F 1/266 713/340 |
| 2007/0174024 A1* | 7/2007 | Rasmussen | H05K 7/20836 703/1 |
| 2007/0180117 A1 | 8/2007 | Matsumoto et al. | |
| 2008/0059921 A1* | 3/2008 | Esliger | G06F 1/3203 716/136 |
| 2008/0155100 A1 | 6/2008 | Ahmed et al. | |
| 2008/0155441 A1* | 6/2008 | Long | G06Q 10/06 715/771 |
| 2008/0174954 A1* | 7/2008 | VanGilder | H05K 7/20836 361/679.54 |
| 2008/0209243 A1* | 8/2008 | Ghiasi | G06F 1/3203 713/320 |
| 2009/0046430 A1* | 2/2009 | Brewer | H05K 7/20736 361/701 |
| 2009/0055507 A1* | 2/2009 | Oeda | G06F 9/4856 709/216 |
| 2009/0055897 A1* | 2/2009 | Morgan | G06F 9/5027 726/3 |
| 2009/0113323 A1* | 4/2009 | Zhao | G06Q 10/10 715/764 |
| 2009/0138313 A1* | 5/2009 | Morgan | G06Q 10/06 705/7.23 |
| 2009/0144566 A1* | 6/2009 | Bletsch | G06F 1/3203 713/300 |
| 2009/0150123 A1* | 6/2009 | Archibald | G06F 17/5004 703/1 |
| 2009/0187782 A1* | 7/2009 | Greene | G06Q 10/00 713/340 |
| 2009/0201293 A1* | 8/2009 | Tung | G06F 1/3203 345/440 |
| 2009/0205416 A1* | 8/2009 | Campbell | G01F 1/34 73/202.5 |
| 2009/0210096 A1* | 8/2009 | Stack | F24F 11/0009 700/278 |
| 2009/0259345 A1* | 10/2009 | Kato | G06F 1/20 700/295 |
| 2009/0276095 A1* | 11/2009 | Pienta | G06F 1/206 700/277 |
| 2009/0276528 A1* | 11/2009 | Pienta | G06F 1/206 709/226 |
| 2009/0292811 A1* | 11/2009 | Pienta | G06F 1/206 709/226 |
| 2009/0309570 A1* | 12/2009 | Lehmann | G06F 1/26 323/318 |
| 2010/0076607 A1* | 3/2010 | Ahmed | G06F 1/206 700/276 |
| 2010/0103837 A1* | 4/2010 | Jungck | H04L 29/12066 370/252 |
| 2010/0235654 A1* | 9/2010 | Malik | G06F 1/3209 713/300 |
| 2011/0208839 A1* | 8/2011 | Oeda | G06F 9/4856 709/219 |

* cited by examiner

FIG. 4

Specification 300

| Device management number | Administrator | Device name | Product name | Model number | Processing performance a | Processing performance b | Processing performance c | Rated power maximum | Rated power idle | Rated temperature maximum | Rated temperature minimum |
|---|---|---|---|---|---|---|---|---|---|---|---|
| | | | | | $\gamma_a$ | $\gamma_b$ | $\gamma_c$ | $P_{max}$ | $P_{idle}$ | | |
| | | | | | | | | | | | |
| | | | | | | | | | | | |

Configuration 310

| CPU model number | CPU maximum frequency | Amount of CPUs | Memory Model number | Memory capacity | Amount of memories | Chipset model number | Disk model number | Disk capacity | Amount of disks | I/O transfer rate | Number of I/Os |
|---|---|---|---|---|---|---|---|---|---|---|---|
| | $f_{max}$ | | | | | | | | | | |
| | | | | | | | | | | | |
| | | | | | | | | | | | |

Operating information (or measuring information, operating history) 320

| Device location coordinate | Workload type | Device/CPU state | CPU operating frequency | CPU utilization | CPU operating temperature | Memory utilization | Disk transfer rate | I/O transfer rate | Device operating power | Intake temperature | Exhaust temperature |
|---|---|---|---|---|---|---|---|---|---|---|---|
| x, y, z | w | | f | $\alpha$ | | | | | $P_{meas}$ | $T_{in}$ | $T_{out}$ |
| | | | | | | | | | | | |
| | | | | | | | | | | | |

OPERATIONS MANAGEMENT METHODS AND DEVICES THEREOF IN SYSTEMS

CROSS-REFERENCE TO RELATED APPLICATION

The present application is a continuation application of U.S. patent application Ser. No. 12/352,166, filed Jan. 12, 2009, and claims priority from Japanese Patent Application No. JP 2008-100927 filed on Apr. 9, 2008, the contents of which is hereby incorporated by reference into this application.

TECHNICAL FIELD OF THE INVENTION

The present invention relates to operations management methods and devices thereof in information-processing systems constituted of information-processing devices such as servers, storage units and networks and facilities for supplying power to or cooling the same. More particularly, it relates to a technique preferable for synthetic energy saving operation management for the information-processing devices and the facilities.

BACKGROUND OF THE INVENTION

According to Japanese Patent Application Laid-Open Publication No. 2004-126968 (patent document 1), in a management server which executes job scheduling for a parallel computer system, a new job is input to a computer at low temperature based on temperature sensor information of the computer and the job is moved from a computer at high temperature to a computer at low temperature, thereby preventing the failures and performance degradation of the parallel computer system due to high temperature. Further, by estimating power consumption of each computer and a cooling unit provided at each computer based on the temperature information before and after a job is moved, whether or not the job can be moved is determined.

According to Japanese Patent Application Laid-Open Publication No. 2007-179437 (patent document 2), in a management system for a plurality of computers, an overheating computer and a non-overheating computer are extracted based on the temperature distribution and operating information of the computers and software is moved from the former to the latter, thereby achieving energy saving. Also, after extracting a target computer, changes in computer electric power and air conditioning electric power before and after the software is moved are compared, thereby determining whether or not the software can be moved. The computer electric power is obtained from the operating information, air conditioning electric power is obtained from the temperature distribution and the temperature distribution is obtained from the temperature sensor, the temperature history and the operating information.

According to US patent application publication No. 2006/0259621 (patent document 3), in a method for allocating workloads to a plurality of servers in a data center, the profile of a requested workload is compared with a history profile and the requested workloads are allocated to servers in accordance with the history in which electric power of the server and air conditioner is at the lowest level. If there is no matching history, the workloads are allocated at random. The history profile includes server location, class, operating information, intake temperature, exhaust temperature, workload type and electric power of the server and air conditioner. The electric power of the server and air conditioner is obtained from the intake/exhaust temperatures of the server, specific heat and amount of air or measured with a power meter.

According to US patent application publication No. 2006/0259793 (patent document 4), in a method for distributing electric power to a plurality of servers in a data center, electric power budget is lent or borrowed between servers or racks neighboring in their geographic locations so as to approach an ideal analog temperature distribution or electric power distribution, and a discretized electric power state of the servers is specified based on the budget allocation, thereby preventing server failures due to a hot spot or cold spot. A thermal multiplier which indicates an ideal electric power to each server is obtained from the exhaust temperature of each server, the reference exhaust temperature of average servers and the intake temperature of the air conditioners.

SUMMARY OF THE INVENTION

With rapid progress of information communication in recent years and toward the integration era of broadcasting and communication, information-processing devices are expected to increase explosively. On the other hand, in order to reduce carbon dioxide for the prevention of the global warming, a large-scale reduction of power consumption of the information-processing devices has been demanded. Particularly in a data center which bears the information processing foundation at a back end, in addition to the electric power consumed by the information-processing devices, the electric power consumed by the facilities for supplying power or cooling accounts for a large proportion of the electric power consumed in the data center, and the synthetic reduction of the electric power of the devices and facilities has been an important issue.

For the energy saving of the data center, various measures have been taken for information-processing devices such as servers, storages, networks, power supply facilities, cooling facilities and system operations management. In the information-processing device, its performance per power consumption has been improved by the use of low power devices and circuits, and the adoption of the energy saving function by switching of operation/idle states in accordance with a workload has been accelerated. In the power supply facilities, reduction of power supply loss in the power supply system from an electric transformer, uninterruptible power supply system, power distribution panel and distributor to the power supplies of the devices and improvement of transformation efficiency have been carried out. In the cooling facilities, improvement of the operating efficiency of the air conditioner itself, optimization of air flow design at intake/discharge ports and introduction of localized cooling and liquid cooling have started recently. In the operations management, operations information monitoring, job scheduling and operations efficiency improvement and consolidation of the devices by virtualization have been mentioned as main measures.

Although the power supply facilities and cooling facilities are designed based on the maximum rated power of the devices in general, the efficiency and electric power of the facilities at the time of operation depend largely on the distribution and changes of electric power of the devices with respect to the facilities. For example, since the power transformation efficiency depends on power load, the power supply loss differs depending on the operating power of the device and the power supply system. Further, since the efficiency of the air conditioner depends on the electric power or heat generation of the device, the positional relation or distance between the air conditioner and the device, temperature, air amount and air direction, the cooling power is largely affected by the electric power and arrangement of the devices.

In the near future, it is expected that the operations management by virtualization of the data center will be progressed and the consolidation or live migration is utilized for energy saving. Therefore, measures for reducing the total electric power of the devices and facilities by sufficiently taking into consideration the unevenness and change with time of the power distribution of devices with respect to facilities will be required. Although some examples have been known as the operations management method for the temperature and electric power in devices such as servers and computers, the cooling facilities and the air conditioners in the prior art, they are still localized or sequentially-taken measures in the light of the above-described synthetic energy saving.

In such a circumstance, although the rise of temperature in the computer is suppressed by allocating a job to a computer having a low temperature of parallel computers in the patent document 1, the computer having a low temperature does not always lead to energy saving in the case where diversified information-processing devices are mixed like in the data center. Further, since the power consumption of the computers is estimated before and after the job is moved, the electric powers are dropped in the computer from which the job is moved and the computer to which it is moved. However, this is only a local energy saving operation in the light of the entire parallel computers. Although the estimation of the power consumption includes the electric power of the cooling facilities attached to each computer, since no consideration is given to the arrangement of the air conditioners and computers, even if the electric powers are dropped in the computers and cooling facilities, the air conditioning power may be raised to increase the total electric power of both the computer and air conditioner depending on the allocation of the job.

In the patent document 2, software is moved and dispersed from an overheating computer to a non-overheating computer. However, the computer having a low temperature does not always consume a low power, and further, more energy saving can be sometimes attained in the entire computers by concentrating software on a particular computer while keeping other computers idled or stopped. Also, although changes in computer power and air conditioning power are compared between before and after the software is moved, the objects for the comparison are limited to the extracted overheating and non-overheating computers, and the total powers of the computers and the air conditioners are not taken into account.

In the patent document 3, a requested workload is allocated to the server based on a history profile in which the electric powers of the server and the air conditioner are the lowest. Consequently, the total powers of the servers and air conditioners can be reduced for a new request within the history, but this cannot cope with a case where there is no adaptable history or an allocated workload is changed largely, or just the sequential improvement in accordance with the accumulation of the history is achieved. Further, although the location of the server is included in the history profile, the air conditioning power is obtained from the server intake/exhaust temperature or power meter and the positional relation between the server and the air conditioner is not considered. Thus, allocating the workload to a server at a location within the range appearing in the history does not always minimize the total powers of the servers and air conditioners.

In the patent document 4, the power budget is lent and borrowed between servers in the neighborhood so as to approach an ideal temperature distribution, and thus, the total power of the entire servers is not reduced. Further, since power is distributed to the servers macroscopically in order to average the temperature, this conflicts with the energy saving by the consolidation of servers. Although the geographic location of the servers, the exhaust temperature and the intake temperature of the air conditioner are referred to distribute the electric power, the electric power and arrangement of the air conditioners are not considered, and thus it does not contribute to the reduction of air conditioning power. The power states specified in the server are a standby mode (standby power) and a maximum operation mode (maximum power) and changes in power in accordance with the workload is not considered, and the energy saving function of the server itself is not used effectively.

As described above, the prior art has such a problem that the powers of the information-processing devices and the air conditioners are reduced just locally or sequentially. Accordingly, an object of the present invention is to reduce the total power of the devices and facilities by comprehensively considering the power distribution and changes of the devices and the arrangement with respect to the facilities, thereby achieving the energy saving operation of the information-processing system typified by the data center. Conceptually speaking, for the energy saving of the devices only, the workloads should be concentrated on a certain device while other devices are idled or stopped, and for the energy saving of the facilities only, the power of the devices is dispersed as much as possible in the arrangement capable of achieving high operation efficiency. Therefore, the present invention provides an operations management method and an operations management device for allocating workloads to devices in an appropriately consolidated and dispersed manner so as to satisfy the contradicting requests of the devices and facilities, thereby achieving the optimization to minimize the total power of the devices and facilities. The above and other objects and novel characteristics of the present invention will be apparent from the description of this specification and the accompanying drawings.

The feature of the typical embodiment of the present invention lies in that means having layout information including the locations and operating information of information-processing devices and the locations and environmental information of facilities and obtaining power consumption of the devices with respect to the workload based on the operating information; and means for obtaining the power supply loss or cooling power of the facilities with respect to the power consumption of the devices based on the layout information are provided, wherein the workloads are allocated to minimize the total power of the devices and facilities.

The locations and operating information of the devices are collected so as to grasp the location and workload of each device of the entire devices instead of extracting the overheating/non-overheating devices as mentioned in the patent document 2. The operating information is sufficient information for calculating power consumption when a workload is moved from one device to another device, and the specification and configuration of the device are included according to need. The locations and environmental information of the facilities are collected so as to grasp the power supply loss of a power supply system from an electric transformer to a device power supply in the case of the power supply facility, and to grasp a heat exchange cycle from the external air to the device or a heat source via the air and refrigerant and a cooling power in the case of the cooling facility. The environmental information is collected also from a built-in sensor or an external sensor of the facility and from the operating information of the devices if necessary.

In the means for obtaining the power of the devices, the power changing in accordance with the amount of the workloads in the entire devices is obtained from the operating information instead of from the temperature information in the patent document 1, the history in the patent document 3, and the fixed power in maximum operating/standby states in the patent document 4 and without limiting the objective devices to overheating/non-overheating devices as in the patent document 2. In the means for obtaining the power of the facilities, the power of the entire facilities in accordance with the power distribution and changes of the devices is obtained from the layout information of the devices and facilities instead of from the temperature distribution in the patent document 2, the history in the patent document 3, and the power of a cooling device included in each device in the patent document 1. In the means for allocating the workloads to devices, the workloads are allocated based on an optimum solution obtained with respect to the entire devices without limiting the objective devices to the devices having a low temperature as in the patent document 1, non-overheating devices as in the patent document 2, devices left in the history as in the patent document 3, and devices neighboring in the geographic location as in the patent document 4.

Another feature of the typical embodiment of the present invention lies in that means for monitoring the layout information including the locations and operating information of the devices and the locations and environmental information of the facilities and allocating virtual workloads to devices based on a current or scheduled workload; means for obtaining a virtual power consumption to the virtual workload of the devices based on operating information; and means for obtaining virtual power supply loss or virtual cooling power of the facilities based on the layout information and virtual power consumption are provided, wherein an optimum solution of the virtual workload allocation which minimizes the total sum of the virtual power consumption of the devices and the virtual power supply loss or virtual cooling power of the facilities is obtained.

A number of combinations exist in the allocations of the workloads to the devices, but by searching for the solution which minimizes the total power of the devices and facilities by allocating virtual workloads, an optimum solution is found out efficiently and real workloads are allocated to the devices based thereon. The allocation of virtual workloads can be carried out to not only current workloads but also scheduled or estimated workloads. In searching for a solution, constraint conditions such as an operating temperature condition or admissibility workload condition of the devices, an admissibility power condition of a power distribution panel and a rack power supply of the power supply facilities, a cooling capacity of the cooling facilities, and an area admissibility power condition for avoiding heat pool of cooling facilities can be taken into consideration.

Still another feature of the present invention lies in that layout information in which the location coordinates and operating information of the devices, the location coordinates of the facilities, and the environmental information regarding power supplying and cooling in a space where the devices and facilities are installed are mapped is provided. The operating conditions and layout of the devices and facilities in a real space are reproduced in a virtual space, whereby allocation of workloads to the devices and operation simulation of the facilities are carried out integrally in a common virtual space and operations management in which the devices and facilities are closely linked with each other is executed. Further, by visualizing the virtual space, the operation monitoring of the devices and facilities, business operation, failure detection, resource management and power control can be carried out collectively and efficiently.

Still another feature of the present invention lies in that a device power function for calculating power consumption to the workload of a device based on the specification of the device, configuration, measuring information, operating information or operating history is provided, wherein the power of the device in accordance with the allocation, change and moving of workloads can be easily obtained. For example, the device power function $p_{Di}$ ($i=1, 2, \ldots$) of the device $i$ can be expressed as shown in the expression 1 where a set of variables indicating a workload $j$ ($j=1, 2, \ldots$) is $l_{jk}$ ($k=1, 2, \ldots$).

$$p_{Di}=p_{Di}(l_{j1},l_{j2},\ldots)p_{Di}(l_j) \qquad \text{[Expression 1]}$$

When the allocation of workloads to the devices is changed, the sets of variables are replaced between devices, and when workloads are allocated to the same device in duplicate, arithmetic operation is carried out between the sets of variables to obtain a power corresponding to the duplicated workload. If a workload exists (device is operated), the device power function $p_{Di}$ is set to a multivariate linear function or nonlinear function, and if no workload exists (device is idled or stopped), it is set to a discontinuous function which gives a power value. The device power function $p_{Di}$ may be a return value or interpolation of a numerical table to a variable.

As the device power function $p_{Di}$, any factor may be adopted appropriately in accordance with obtained information and required calculation accuracy. For example, a step function corresponding to ON/OFF of a device is adopted if a maximum rated power is known from the specification and configuration of the device, a linear function expressed with a slope and intercept is adopted if the maximum power and standby power is known, a conditional function set is adopted if plural operating states, standby state, idle state or stop state are known as operating information, and a quadratic function to which operating history data is fitted is adopted if the power consumption of a device can be monitored. For simplification, the set of variables $l_j$ may be consolidated to main factors which affect power. For example, the main factor is maximum performance, utilization or an operating state (frequency, voltage) of a processor for the server unit, the number of activated disks, access pattern or access time for the storage unit, and transfer throughput or switching frequency for the network unit.

Still another feature of the present invention lies in that a facilities power function for calculating the power supply loss or cooling power of a facility with respect to the power consumption and locations of the devices and the environmental information and locations of the facilities is provided, thereby easily obtaining the power of facility in accordance with the power distribution of the devices by the allocation of workloads. For example, the power supply loss function $p_s$ and the cooling power function $p_c$ can be expressed as shown in the following expressions 2 and 3 where the power of a device $i$ is $p_{Di}$, the location thereof is $x_i$ ($x_i$, $y_i$, $z_i$), the environmental information of a facility $\iota$ ($\iota=1, 2, \ldots$) is $\epsilon_\iota$, the location thereof is $\chi_\iota$ ($x_\iota$, $y_\iota$, $z_\iota$).

$$p_S=p_S((p_{D1},x_1),(p_{D2},x_2),\ldots,(\epsilon_1,\chi_1)(\epsilon_2,\chi_2)\ldots) \qquad \text{[Expression 2]}$$

$$p_C=p_C((p_{D1},x_1),(p_{D2},x_2),\ldots,(\epsilon_1,\chi_1),(\epsilon_2,\chi_2),\ldots) \qquad \text{[Expression 3]}$$

The power supply loss function $p_s$ obtains a power supply system from an electric transformer, uninterruptible power supply, power distribution panel and distributor to a device power supply based on the location of the device and the environmental information and the location of a power supply facility, and calculates a power supply efficiency and power supply loss to device power or power load along the power supply system, thereby calculating the power supply loss of the entire power supply facilities. The cooling power function $p_c$ carries out thermo-fluid simulation of the room where devices are installed and heat exchange simulation of cooling system from an indoor cooling unit to external machines such as a chiller and cooling tower based on the locations and power (heat source distribution) of devices and the environmental information and locations of cooling facilities, thereby calculating the cooling power of the entire cooling facilities.

As a location $x_i$ of a device, an expression capable of identifying its three-dimensional location, such as the two-dimensional location of the rack in which the device is mounted and the number in a rack height direction or the two-dimensional location of a floor tile on which the device is placed and the height thereof from the tile, can be used in addition to its three-dimensional location coordinates. As the environmental information $\epsilon_t$ of the power supply facility, the power load characteristic of a power supply, distributor or wiring and I/O power monitored by each machine or rack can be used. As the environmental information $\epsilon_t$ of the cooling facility, the temperature and humidity of the air and refrigerant, flow amount, flow rate, flow direction, operating temperature of a device, intake/exhaust temperature of a rack and a intake/exhaust port, intake/exhaust temperature or flow amount of indoor machine or outdoor machine, temperature and humidity of the external air, thermal load characteristic of each machine or the like can be used. As the location information $\chi_t$ of a facility, topological connecting information such as the connecting destination and mutual distance of respective machines can be used in addition to its three-dimensional location.

Still another feature of the present invention lies in that a combinational optimization problem of allocating workloads to devices is defined with using the total sum of the device power function and facilities power function as an objective function, thereby obtaining an optimum solution which minimizes the objective function or an executable approximation solution near the optimum solution. For example, an objective function P which indicates the total power of the devices and facilities can be expressed as shown in expression 4 by using the device power function $p_{Di}$ of the expression 1 and the facilities power functions $p_s$ and $p_c$ of the expressions 2 and 3.

$$P = \sum_i p_{Di} + p_S + p_C = \sum_i p_{Di}(l_j) + p_S(p_{Di}(l_j)) + p_C(p_{Di}(l_j))$$ [Expression 4]

The device power $p_{Di}$ is a function $p_{Di}(l_j)$ which depends on the allocation of a workload j to the device i, and the facility powers $p_s$ and $p_c$ depending on the device power $p_{Di}$ can be expressed as functions $p_s(p_{Di}(l_j))$ and $p_c(p_{Di}(l_j))$ with using $p_{Di}(l_j)$ (i, j=1, 2, . . . ) as a variable ($p_s$ and $p_c$ are expressed simply although they are the functions of the location $x_i$ of the device, the environmental information $\epsilon_t$ of the facility and a location $\chi_t$). Accordingly, since the objective function P depends on the allocation of the workload j to the device i, the reduction of the total power of the devices and facilities can be converted to the optimization problem of searching for the solution minimizing the objective function P from the combinations of workload allocations. The number of combinations N in allocating m workloads to n devices while permitting duplications can be expressed as shown in expression 5.

$$N = {}_nH_m = {}_{n+m-1}C_m = \frac{(n+m-1)!}{m!(n-1)!}$$ [Expression 5]

Upon solving this combinational optimization problem, if n and m are small or the time interval of the workload allocation is long enough, an optimum solution can be obtained by searching all the solution spaces. In other cases, however, an approximation solution method of efficiently searching for a solution is used. As the approximation solution method, as well as generally known meta-heuristic algorithms such as local search, hill-climbing search, annealing search and taboo search, an algorithm which utilizes the performance/power index of the devices and the characteristics of the facilities and is specialized in this problem can be adopted.

Still another feature of the present invention lies in that the facilities power function with respect to the power and location of the devices and the environmental information and location of the facilities is approximately disassembled into element functions expressing a facility power required for each device, thereby solving the combinational optimization problem in a simple manner. Since the sum of the device power function and the facilities element function is defined for each device as a device function, the value of the objective function for the workload allocation can be calculated in a short time. For example, the element functions $p_{si}$ and $p_{ci}$ of the power supply loss and cooling power to the device i can be expressed as shown in expressions 6 and 7 ($p_{si}$ and $p_{ci}$ are expressed simply although they are also the functions of the environmental information $\epsilon_t$ and location $\chi_t$ of the facility).

$$p_{Si} = p_{Si}(p_{Di}, x_i)$$ [Expression 6]

$$p_{Ci} = p_{Ci}(p_{Di}, x_i)$$ [Expression 7]

Although the facilities power functions $p_s$ and $p_c$ are functions for the entire devices and facilities like the expressions 2 and 3, if the power distribution of the devices and the environmental information and locations of the facilities are not changed largely or not deflected extremely, they may be considered as facilities element functions $p_{si}$ and $p_{ci}$ for each device separately by approximating an interaction and a non-linear action. Alternatively, the facilities element function may be corrected so as to include the interaction between the devices existing relatively in the neighborhood. The device function $p_i$ is the sum of the facilities element functions $p_{si}$ and $p_{ci}$ and the device power function $p_{Di}$ and can be expressed as shown in expression 8. The objective function P is the total sum of the device functions $p_i$ of the entire devices and can be expressed as shown in expression 9.

$$p_i = p_{Di} + p_{Si} + p_{Ci} = p_{Di}(l_j) + p_{Si}(p_{Di}(l_j)) + p_{Ci}(p_{Di}(l_j))$$ [Expression 8]

$$P = \sum_i p_i(l_j)$$ [Expression 9]

When the objective functions P of the expressions 4 and 9 are compared, the facility powers $p_s$ and $p_c$ need to be obtained for the entire power distribution of the devices in the case of the expression 4, but the device function $p_i$ only has to be obtained for each of the devices in the case of the expression 9. Therefore, the calculation of the objective function P for each allocation of the workload is simplified, and the search for a solution can be performed efficiently. Also, if a specific table of the device function $p_i$ is obtained, the solution space can be narrowed down to the vicinity of an optimum solution by using the coefficients of variables and the differentiation of the expressions as an index of the device to which the workload should be allocated with priority.

Still another feature of the present invention lies in that the combinational optimization problem of allocating the workloads to the devices is solved with using the admissibility workload condition of the devices and the admissibility power condition of the facilities as constraint conditions, thereby extracting an executable solution from combinations to obtain a solution efficiently. At the same time, by conforming to the constraint condition, the performances of the devices and facilities are exerted efficiently and failures due to excessive power or a temperature rise are prevented, thereby improving the reliability.

If a workload exceeding the maximum performance or maximum resource of a device is allocated, the processing time for the workload is extended to increase the amount of electric power (electric power×time). Thus, the admissibility workload condition of a device is set up in consideration of the margin for the changes of the workload. Also, as a set of variables $l_j$ which indicates a workload in the device power function, a factor affecting electric power is mainly selected. However, even the factor which scarcely affects the electric power is sometimes important for the performance of the device or resource. For example, those factors are memory capacity of the device, disk capacity, I/O throughput capacity and the like. These factors are handled as the admissibility workload conditions for determining whether or not an allocation of the workload is acceptable separately from the device power function.

The power supply facility has a rated power for the power supply, power distribution panel and distributor depending on the power supply system, and it is necessary to conform to an admissibility power condition set with the rated power as an upper limit. If a power supply system does not conform to this condition, it is necessary to reduce the workload of the devices connected to this power supply system or limit the electric power of the devices. The cooling facility has a rated processing capacity such as air conditioners, localized cooling units, liquid-cooling devices, chillers and cooling towers, and the power of the devices need to be lower than the capacity. Also, for the cooling facilities, an admissibility power condition can be set for the area of space, sections and rack rows in which the devices are arranged in order to keep the device in the operation temperature range and to avoid an excessive concentration of heat generation to raise the cooling efficiency.

Still another feature of the present invention lies in that the power consumption to the locations of the devices or electric power distribution is obtained based on an optimum solution or approximation solution obtained by solving the workload allocation problem to devices and layout information, thereby controlling the power supply facility and cooling facility. Accordingly, the operation efficiency of the facilities can be improved and power supply loss and cooling power can be suppressed. For example, in the power supply facility, the number of operating machines connected in parallel is changed in accordance with the output power, thereby improving the power supply efficiency, and in the cooling facility, the supply temperature of the air and refrigerant, the air amount and air flow direction of intake/exhaust ports and fans, and the temperature and flow rate of chillers and cooling towers and the like are adjusted in accordance with the heat generation distribution, thereby improving the cooling efficiency.

Still another feature of the present invention lies in that a virtualization environment, job scheduler, SAN boot environment and operations management are used as means for allocating the workloads to the devices. These means may be selected by considering the timing or cycle of workload allocation, overhead and loss time accompanied by the movement of the workload, change and generation or extinction of the workload, link of the device to the workload, acquirable operating information of a device, easiness of introduction to an existing or new system, security and reliability of the system and the like, and may be mixed in parallel or hierarchically. The workloads are allocated to the devices based on the arrangement of virtual devices to physical devices in the case of the virtualization environment, based on the arrangement of jobs to the devices in the case of the job scheduler, based on the arrangement of the devices to be activated in the case of the SAN boot environment, and based on the arrangement of the devices to be operated, idled or stopped in the case of the operations management.

Still another feature of the present invention lies in that the devices are operated so as to reduce the total power of the devices and facilities in reflection of the changes in allocation of the workloads to the devices. In the server units, software for providing workloads such as applications, virtual machines and jobs is moved. In the storage units, data having a high access frequency is moved or copied, whereby the workload is moved to the moving destination. In the network unit, the network connecting configuration is changed, whereby its operation node is changed.

The effects obtained by typical one of the inventions disclosed in this application will be briefly described below. For example, in the information-processing system like a data center, the total power consumption of the devices and facilities can be reduced by operations management in which the information-processing devices and the facilities are linked with each other.

BRIEF DESCRIPTIONS OF THE DRAWINGS

FIG. 4 is a numerical table indicating operating information of information-processing devices in an operations management method of an information-processing system according to the fourth embodiment of the present invention;

DESCRIPTIONS OF THE PREFERRED EMBODIMENTS

Hereinafter, embodiments of the present invention will be described in detail with reference to the accompanying drawings. Components having the same function are denoted by the same reference numbers throughout the drawings for describing the embodiments, and the repetitive description thereof will be omitted. In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable. Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above.

First Embodiment

Figure 1:
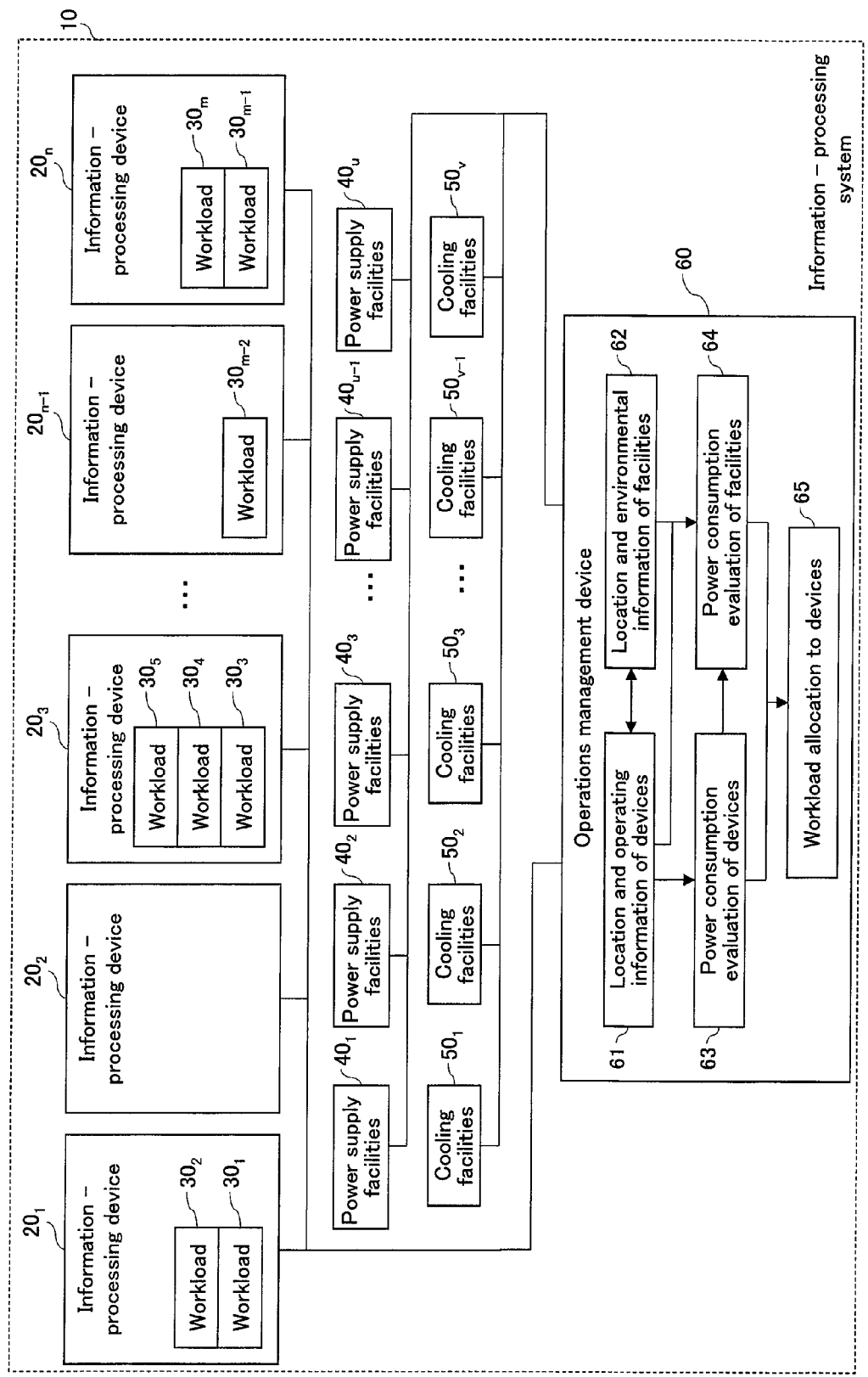
FIG. 1 is a configuration diagram showing an operations management device and an operations management method in an information-processing system according to the first embodiment of the present invention.

FIG. 1 is a configuration diagram showing an operations management device and an operations management method in an information-processing system according to the first embodiment of the present invention. The information-processing system 10 includes information-processing devices $20_1$ to $20_n$, power supply facilities $40_1$ to $40_u$ for supplying power to the devices $20_1$ to $20_n$, cooling facilities $50_1$ to $50_v$ for cooling the devices $20_1$ to $20_n$, and an operations management device 60 for managing the devices $20_1$ to $20_n$, the power supply facilities $40_1$ to $40_u$ and the cooling facilities $50_1$ to $50_v$.

Workloads $30_1$ to $30_m$ are allocated to the devices $20_1$ to $20_n$. As for the workloads $30_1$ to $30_m$, like an example shown in FIG. 1, a single workload is allocated to the device (device $20_{n-1}$ and workload $30_{m-2}$), a plurality of the workloads are allocated (device $20_1$ and workloads $30_1$ to $30_2$, device $20_3$ and workloads $30_3$ to $30_5$, device $20_n$ and workloads $30_{m-1}$ to $30_m$), and no workload is allocated (device $20_2$).

The operations management device 60 includes means 63, which is connected to the devices $20_1$ to $20_n$ and the facilities $40_1$ to $40_u$ and $50_1$ to $50_v$ and has layout information constituted of the locations and operating information 61 of the devices $20_1$ to $20_n$ and the locations and environmental information 62 of the facilities $40_1$ to $40_u$ and $50_1$ to $50_v$ so as to obtain the power consumption of the devices $20_1$ to $20_n$, means 64 which obtains a power supply loss of the power supply facilities $40_1$ to $40_u$ and a cooling power of the cooling facilities $50_1$ to $50_v$ and means 65 which obtains an allocation of the workloads $30_1$ to $30_m$ to the devices $20_1$ to $20_n$. The operations management device 60 is realized by, for example, programming process using a computer system.

In the operations management method of the first embodiment, the operations management device 60 communicates with the devices $20_1$ to $20_n$ and the facilities $40_1$ to $40_u$ and $50_1$ to $50_v$, thereby collecting the operating information of the devices $20_1$ to $20_n$ and the environmental information of the facilities $40_1$ to $40_u$ and $50_1$ to $50_v$ to acquire layout information 61 and 62. The operations management device 60 obtains the power consumption of the devices $20_1$ to $20_n$ with respect to the workloads $30_1$ to $30_m$ based on the operating information 61 of the devices $20_1$ to $20_n$ by the means 63, obtains power supply loss of the power supply facilities $40_1$ to $40_u$ and the cooling power of the cooling facilities $50_1$ to $50_v$ based on the locations of the devices $20_1$ to $20_n$, the power consumption obtained by the means 63, the locations of the facilities $40_1$ to $40_u$ and $50_1$ to $50_v$ and the environmental information 62 by the means 64, and obtains allocations of the workloads $30_1$ to $30_m$ to the devices $20_1$ to $20_n$ so as to reduce the total power consumption of the devices $20_1$ to $20_n$ and the facilities $40_1$ to $40_u$ and $50_1$ to $50_v$ based on the means 63 and 64.

The location information of the devices $20_1$ to $20_n$ included in the layout information 61 is composed of the location coordinates of each device or identification data for identifying the location, and includes connecting configuration data between devices according to need. The operating information of the devices $20_1$ to $20_n$ is composed of data indicating a workload amount and data indicating power consumption or the like and includes, for example, performance, resource utilization, operating/stop state, rated power or measured power, and operating temperature. The workload amount data is general-purpose measurement which can be exchanged between devices and not dependent of any particular device, workload, and a relation between a device and a workload. The power consumption data is a numerical value, expression or numerical table which expresses directly or indirectly the power consumption characteristic of the device with respect to the workload amount, and it depends on the respective devices.

The location information of the facilities $40_1$ to $40_u$ and $50_1$ to $50_v$ included in the layout information 62 is composed of the location coordinates of each facility or identification data for identifying the location and the connecting configuration data between facilities. The environmental information of the facilities $40_1$ to $40_u$ and $50_1$ to $50_v$ is composed of the operating data and operation characteristic data of the facilities and monitoring data of a surrounding environment, and includes, for example, electric power, temperature, humidity, flow rate, flow direction, rated power and rated performance. The operation characteristic data is a numerical value, expression or numerical table which expresses the power supply loss characteristic to a power load in the case of the power supply facilities and the power consumption characteristic to heat load in the case of the cooling facilities. Note that the operating information of the devices $20_1$ to $20_n$ and the environmental information of the facilities $40_1$ to $40_u$ and $50_1$ to $50_v$ can supplement each other like electric power data of a temperature data facility of the device.

In the means 63 for obtaining power consumption of the devices $20_1$ to $20_n$, as one method, a given workload amount is verified with a known numeric data each time, and a power consumption is calculated by interpolation and statistical processing. As another method, the relationship of device power with respect to the workload amount is preliminarily formulated with using the workload amount as a variable or turned into a routine for outputting a return value from a numerical table with using the workload amount as an argument. In the former method, verification and calculation take much time as the operating information of the devices $20_1$ to $20_n$ is accumulated, but the calculation accuracy is improved. In the latter method, by correcting the relational expression and numerical table with an accumulation of the operating information, required time can be suppressed while the accuracy is raised, and further, the relation between the workload amount and the device electric power can be grasped with a good view.

In the means 64 for obtaining the power consumption of the facilities $40_1$ to $40_u$ and $50_1$ to $50_v$, as one method, simulation is carried out each time to calculate a power supply loss and cooling power based on the locations of the devices $20_1$ to $20_n$ in the layout information 61, the power consumption of the devices $20_1$ to $20_n$ obtained by the means 63 and the locations and environmental information of the facilities $40_1$ to $40_u$ and $50_1$ to $50_v$ in the layout information 62. As another method, a detailed simulation is carried out on a presumed condition preliminarily and linear approximation is executed, whereby a relation of element power of the facility with respect to the location and power of each device is obtained in the form of a numeric expression, numerical table or simple simulator. The former method can obtain a high accuracy if a calculation time is allowed. The latter method can shorten the calculation time while ensuring the accuracy within the presumed condition because the detailed simulation can be completed in advance.

There are some methods for the means 65 for obtaining an allocation of the workloads $30_1$ to $30_m$ to the devices $20_1$ to $20_n$. As one method, the power of the devices and power of the facilities are calculated each time for the combinations of the workload allocations to the devices by the means 63 and 64, and an allocation solution which minimizes the total power is selected by comparing calculation results of the combinations. As another method, a priority order index in the workload allocation is derived from the relation of the device power to the workload amount preliminarily obtained by the means 63 and the relation of the facilities element power to the power distribution of the devices preliminarily obtained by the means 64, and workloads are allocated to the devices along the index. The former method is suitable for obtaining an optimum solution which minimizes the total power when there are few combinations, and the latter method is suitable for obtaining an optimum solution or an approximation solution fast when there are a number of combinations. In the latter method, it is permissible that the power distribution of the devices to an obtained allocation solution is calculated in accordance with the accuracy of the solution and calculation time, a relation of the facilities element power to this is obtained again, an index is derived by using the relation to obtain the workload allocation again, and then this procedure is repeated until the anterior and posterior allocation solutions converge within a predetermined condition.

In the operations management method of the information-processing system 10 according to the first embodiment, since the layout information composed of the locations of the devices $20_1$ to $20_n$ and the operating information 61 and the locations of the facilities $40_1$ to $40_u$ and $50_1$ to $50_v$ and the environmental information 62 is provided, an optimum solution for allocating the workloads $30_1$ to $30_m$ to the devices $20_1$ to $20_n$ is obtained and thus an effect of reducing the total power consumption including the power consumption of the devices $20_1$ to $20_n$ and the power supply loss or cooling power of the facilities $40_1$ to $40_u$ and $50_1$ to $50_v$ can be achieved. Further, by updating the workload allocation to the devices $20_1$ to $20_n$ in accordance with a desired opportunity or plan, input of a new workload, termination of existing workload and the like, the energy saving operation of the information-processing system 10 can be achieved.

Although the information-processing system 10 is typified by data center and computer room, this embodiment can be applied to the operations management systems of industrial facility, commercial facility, communication facility and transportation facility. Further, this embodiment is applicable not only to operations management of existing system but also as a design/diagnostic tool for system installation, extension, relocation and repair. Also, this embodiment can be applied to even a system stretched over a plurality of facilities or places by remote control.

The information-processing devices $20_1$ to $20_n$ include a server unit, storage unit, network unit and the like. The server unit includes a general-purpose server, specialized server, main frame, parallel computers, super computer, built-in computer and personal computer, and the storage unit includes a magnetic disk, fixed disk, optical disk and tape. The network unit includes a rooter, switch and hub, and peripheral units include a printer, copier, modem and display. Further, this embodiment can be applied to a unit having demand-based switching function for operation, waiting, idle and stop states, that is, energy saving mode. This corresponds to DBS in the server, MAID in the storage, and a port power supply control in the network. As for the hardware style, this embodiment can be applied to various types including a blade type, rack mount type, tower type and special casing type.

The workloads $30_1$ to $30_m$ refer to applications for the server unit, access data for the storage unit and transfer data for the network unit. The workload amount data refers to performance, resource utilization and operating/idle state for the server unit, a number of activated disks, access pattern and access time for the storage unit, and a number of transfer packets and switching frequency for the network unit. Also, as the workload type, by classifying fixed/floating decimal point operation, transaction processing, database processing, technical computation, format and granularity of data, and guaranteed band, the power consumption characteristic of the device can be taken into consideration.

The power supply facilities $40_1$ to $40_u$ include an electric transformer, uninterruptible power supply system, power distribution panel, distributor and a power supply of a rack in which devices are mounted, and a power sensor, current/voltage sensor and leak sensor are also included therein. Further, depending on a case, a power plant, power transmission facility, transformation facility for the power supply and a power source of a device to which power is to be supplied are also included therein. The cooling facilities $50_1$ to $50_v$ include air conditioner, chiller, cooling tower, intake/exhaust port, fan, duct and refrigerant pipe, and a temperature sensor, humidity sensor and flow rate/flow direction sensor disposed indoor and outdoor are also included therein. Further, depending on a case, a liquid-cooling device, localized cooling device for a rack row and rack front/rear faces and cooling unit of the device are also included therein.

The operations management device 60 is provided with a common manager server for both the information-processing devices $20_1$ to $20_n$ and the facilities $40_1$ to $40_u$ and $50_1$ to $50_v$. Alternatively, the manager servers of the both may be linked and the manager function may be assumed by a part of the devices $20_1$ to $20_n$. The operations management method of this embodiment can be installed as software such as middleware, application, built-in control software and firmware, and for example, an engine for solving the optimization problem can be installed as hardware. In order for the manager to acquire the operating information of the devices and the environmental information of the facilities, each device and facility are provided with an agent, service processor and interface, or the devices and facilities may establish autonomous distribution system. Note that, since the effect of reducing the total power of the devices and facilities in this embodiment is exerted by the layout information indicating the locations and the operating information of the devices and the locations and the environmental information of the facilities, the means for obtaining the power consumption of the devices, the means for obtaining the power consumption of the facilities and the means for obtaining the workload allocation to the devices, it is not limited by the devices shown in the first embodiment and FIG. 1, any calculation procedures and others.

Second Embodiment

Figure 2:
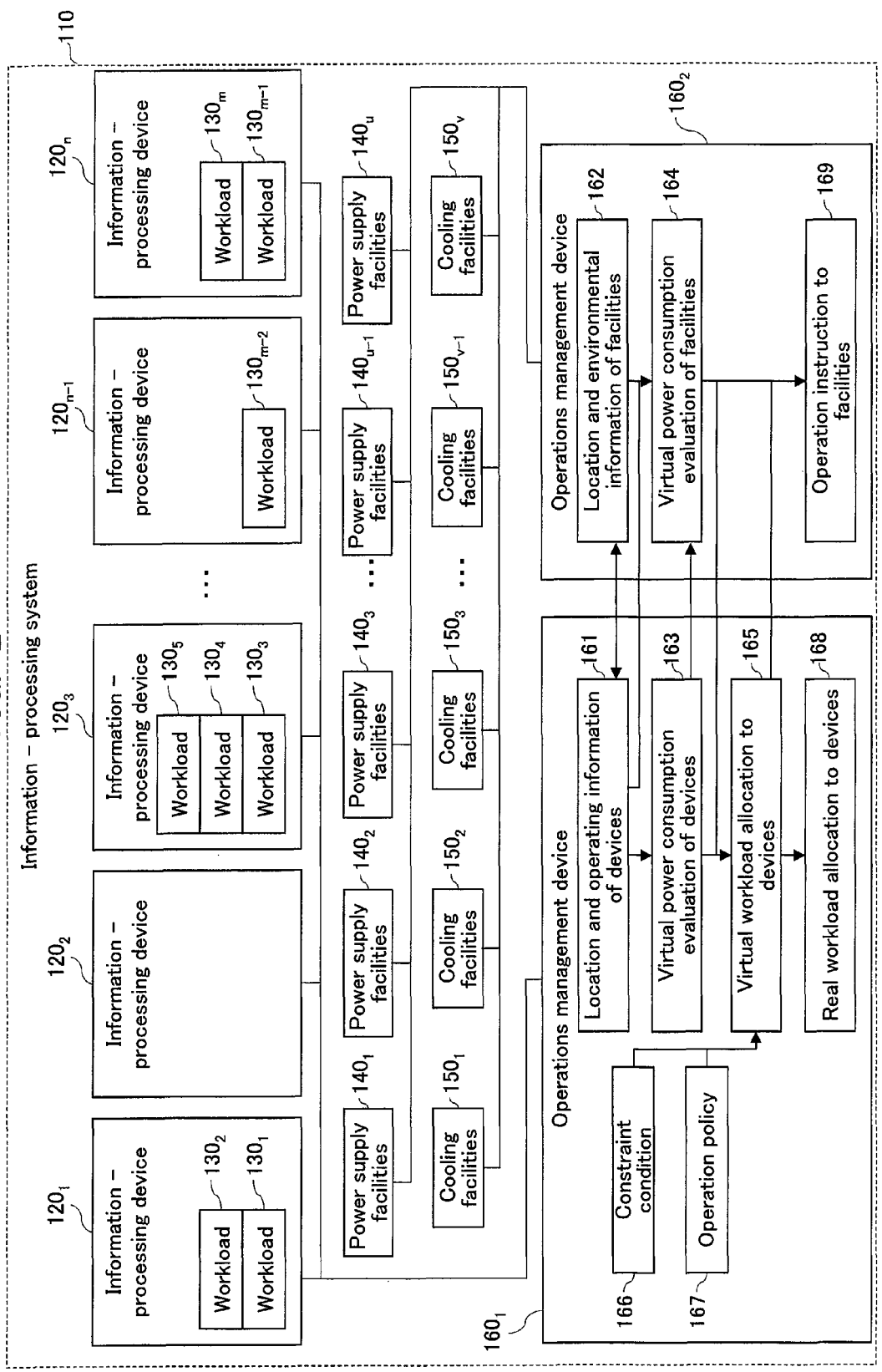
FIG. 2 is a configuration diagram showing an operations management device and an operations management method in an information-processing system according to the second embodiment of the present invention.

FIG. 2 is a configuration diagram showing an operations management device and an operations management method in an information-processing system according to the second embodiment of the present invention. The information-processing system 110 includes information-processing devices $120_1$ to $120_n$, power supply facilities $140_1$ to $140_u$ for supplying power to the devices $120_1$ to $120_n$, cooling facilities $150_1$ to $150_v$ for cooling the devices $120_1$ to $120_n$, and operations management devices $160_1$ and $160_2$ for managing the devices $120_1$ to $120_n$, the facilities $140_1$ to $140_u$ and $150_1$ to $150_v$, and workloads $130_1$ to $130_m$ are allocated to the devices $120_1$ to $120_n$.

The operations management device $160_1$ is connected to the devices $120_1$ to $120_n$ so as to monitor the operating information of the devices $120_1$ to $120_n$, and has layout information 161 composed of the locations and operating information of the devices $120_1$ to $120_n$, and it includes means 163 for obtaining power consumption of the devices $120_1$ to $120_n$, means 165 for obtaining an allocation of virtual workloads $130_1$ to $130_m$ to the devices $120_1$ to $120_n$, and means 168 for allocating real workloads $130_1$ to $130_m$ to the devices $120_1$ to $120_n$. An operations management device $160_2$ is connected to facilities $140_1$ to $140_u$ and $150_1$ to $150_v$ so as to monitor the environmental information of the facilities $140_1$ to $140_u$ and $150_1$ to $150_v$, and has layout information 162 composed of the locations and environmental information of the facilities $140_1$ to $140_u$ and $150_1$ to $150_v$, and it includes means 164 for obtaining the power supply loss of the power supply facilities $140_1$ to $140_u$ and the cooling power of the cooling facilities $150_1$ to $150_v$ and means 169 for giving an operation instruction to the facilities $140_1$ to $140_u$ and $150_1$ to $150_v$.

In the operations management method according to the second embodiment, the operations management device $160_1$ on the device side and the operations management device $160_2$ on the facility side are linked with each other so as to exchange necessary data between the operations management devices $160_1$ and $160_2$. In the operations management device $160_1$, a relation of power consumption of the devices $120_1$ to $120_n$ to the workload is obtained based on the operating information 161 of the devices $120_1$ to $120_n$ by the means 163. In the operations management device $160_2$, a relation between the power supply loss of the power supply facilities $140_1$ to $140_u$ and the cooling power of the cooling facilities $150_1$ to $150_v$ with respect to the locations and power consumption of the devices $120_1$ to $120_n$ obtained from the operations management device $160_1$ is obtained based on the layout information 162 of the facilities $140_1$ to $140_u$ and $150_1$ to $150_v$ obtained by the operations management device $160_2$ by the means 164.

Further, in the operations management device $160_1$, based on the relation of the device power with respect to the workload in the means 163 and the relation of the facility power with respect to the device power distribution in the means 164, an allocation solution of the virtual workloads to the devices $120_1$ to $120_n$ is derived so as to conform to the constraint condition 166 of the devices $120_1$ to $120_n$ or the facilities $140_1$ to $140_u$ and $150_1$ to $150_v$ and the operation policy 167 to the workloads $130_1$ to $130_m$ and to minimize the total power consumption of the devices $120_1$ to $120_n$ and the facilities $140_1$ to $140_u$ and $150_1$ to $150_v$ by the means 165. Upon reception of the result, the operations management device $160_1$ allocates real workloads to the devices $120_1$ to $120_n$ by the means 168 at an appropriate timing, and the operations management device $160_2$ gives an operation instruction to the facilities $140_1$ to $140_u$ and $150_1$ to $150_v$ based on a power distribution of the devices $120_1$ to $120_n$ and the layout information 162 by the means 169.

In the operations management method of the information-processing system 110 of the second embodiment, the means 165 for obtaining the allocation solution of the virtual workloads to the devices $120_1$ to $120_n$ can calculate scheduled or estimated workloads in addition to the current workloads $130_1$ to $130_m$ as the virtual workloads and make a determination with respect to the constraint condition 166 and the operation policy 167 including a time passage from the present with a good view. Consequently, a divergence from the optimum solution in the real workload allocation, failures due to violation of the condition and overhead due to complicated repairs can be avoided. Further, by the separation into the virtual workload allocation by the means 165 and the real workload allocation by the means 168, a timing for executing an allocation change by the means 168 and a timing for giving the operation instruction to the facilities $140_1$ to $140_u$ and $150_1$ to $150_v$ by the means 169 can be set up appropriately with taking into account a time required for the derivation of an allocation solution in addition to forecast of the workload.

The constraint condition 166 includes the admissibility workload condition considering the operating temperature of the devices $120_1$ to $120_n$, maximum workload and a margin for the changes in the workload, the admissibility power condition considering the rated power of the power supply facilities $140_1$ to $140_u$ and power supply efficiency, and the admissibility power condition among sections and devices in the neighborhood considering the rated performance of the cooling facilities $150_1$ to $150_v$ and the flow rate/flow direction. The contents described in the operation policy 167 include the priority order of the workload, execution timing, processing period, schedule, resource distribution of the devices $120_1$ to $120_n$ to the workloads, service level and power cost. By providing the constraint condition 166 and the operation policy 167 first at a stage of allocating the virtual workloads to the devices $120_1$ to $120_n$ by the means 165, turn-back can be eliminated in comparison with the case of verifying the constraint condition 166 and the operation policy 167 after an allocation solution is once obtained, and a solution can be obtained efficiently because candidates can be narrowed down from the combinations of the virtual workload allocations. In addition, faults and failures of the devices $120_1$ to $120_n$ and the facilities $140_1$ to $140_u$ and $150_1$ to $150_v$ can be avoided by the constraint condition 166, and advanced operations management which can achieve both the energy saving and the service improvement can be realized by the operation policy 167.

In the second embodiment, by providing the operations management device $160_1$ on the device side and the operations management device $160_2$ on the facility side, the calculation processings of the both are separated to avoid the complication thereof, and closely coordinated operation is achieved through an interface therebetween. Although high speed operation can be done by distributed processing if installing the both on separate manager servers, the both may be installed in a common manager server if a sufficient calculation performance is provided. Also, according to the second embodiment, an operation instruction can be given to the facilities $140_1$ to $140_u$ and $150_1$ to $150_v$ in advance based on the power distribution of the devices $120_1$ to $120_n$. Therefore, compared with a case of controlling the facilities passively like in the prior art, the necessity of providing an excessive margin is eliminated, and thus an efficient operation without waste can be performed.

Third Embodiment

Figure 3:
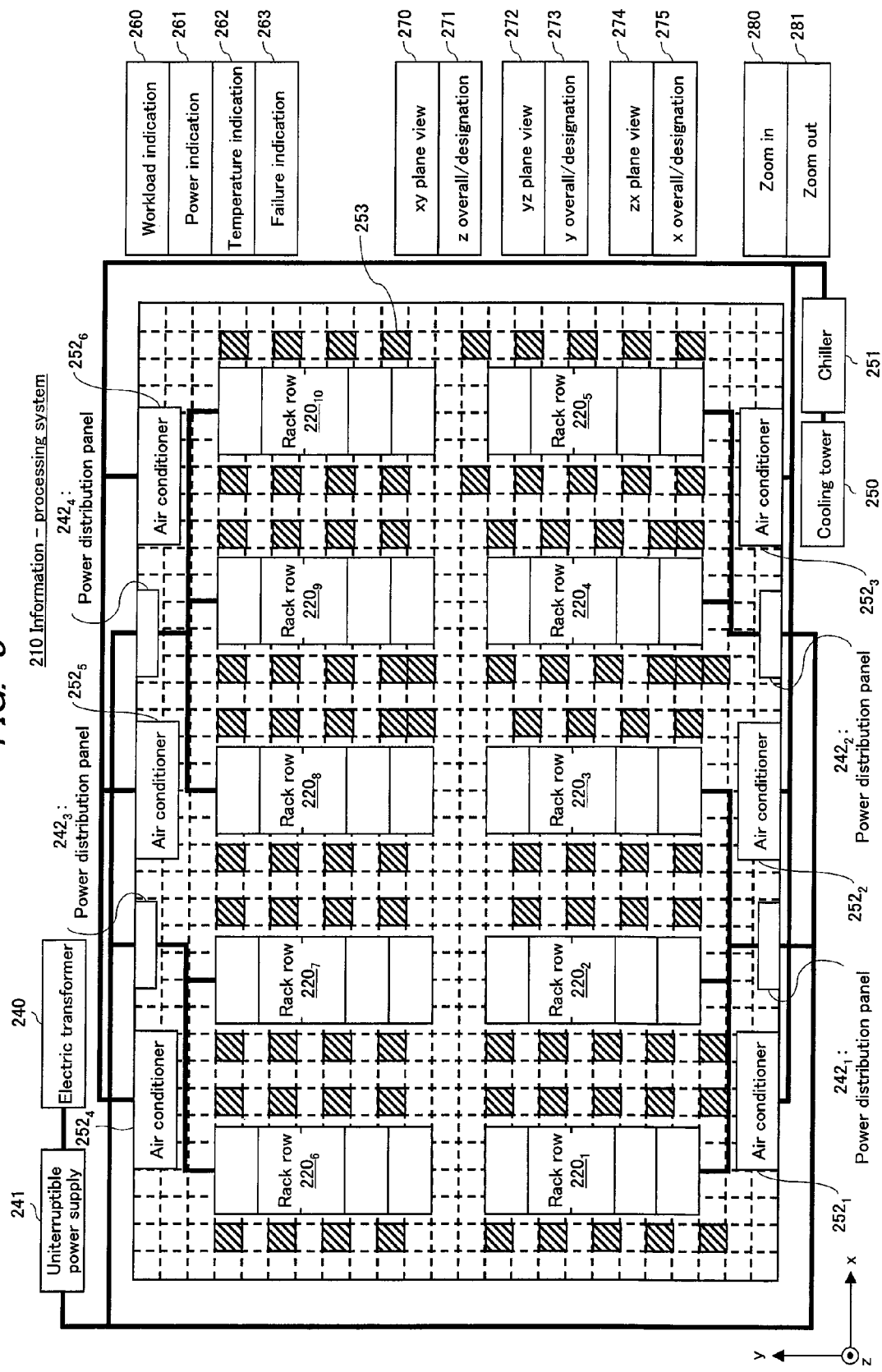
FIG. 3 is a layout diagram showing layout information in an operations management method of an information-processing system according to the third embodiment of the present invention.

FIG. 3 is a layout diagram showing layout information in an operations management method of an information-processing system according to the third embodiment of the present invention, in which an example of the display screen of the operations management device described in the first embodiment and the second embodiment is shown. The information-processing system 210 includes information-processing devices, rack rows $220_1$ to $220_{10}$ in which the devices are mounted, power supply facilities composed of an electric transformer 240, an uninterruptible power supply system 241 and power distribution panels $242_1$ to $242_4$, and cooling facilities composed of a cooling tower 250, a chiller 251, air conditioners $252_1$ and $252_6$ and a grille 253.

In the power supply facility, power is supplied from the electric transformer 240 through the uninterruptible power supply system 241 and the power distribution panels $242_1$ to $242_4$ to the rack rows $220_1$ to $220_{10}$, and further supplied from the power distribution unit of the rack row to the information-processing device. The cooling facility executes underfloor air conditioning and the air conditioners $252_1$ to $252_6$ supply cooling air through the grilles 253 (though they are plural in number but represented with a single symbol) to suck hot air generated by the heat of the devices. Further, the air conditioners $252_1$ to $252_6$ exchange heat with the chiller 251 and the cooling tower 250, and the cooling tower 250 radiates heat to the outside.

The layout of the third embodiment corresponds to the layout information in which the location coordinates and operating information of the devices and the location coordinates and environmental information of the facilities are mapped, and it is obtained by reproducing and visualizing the real space information where the devices and the facilities are installed on a virtual space of the operations management device. The layout information indicates the arrangement of the devices in a room (not shown in FIG. 3 because this is an entire diagram) and the arrangement of the rack rows $220_1$ to $220_{10}$, the power distribution panels $242_1$ to $242_4$, the air conditioners $252_1$ to $252_6$ and the grilles 253, as well as a connecting configuration of power supply system from the electric transformer 240 existing outdoor and the uninterruptible power supply system 241 to the power distribution panels $242_1$ to $242_4$ and the rack rows $220_1$ to $220_{10}$ and a connecting configuration of a heat exchange system composed of the cooling tower 250 existing outdoor, the chiller 251 and the air conditioners $252_1$ to $252_6$.

In the third embodiment, various indications are enabled by clicking buttons 260 to 263, 270 to 275, 280 and 281 on the display screen. The workload indication button 260 can display a workload distribution of the devices. The kinds of devices such as the server, storage and network and the workload amount are indicated with the colors and density of images for each of the rack rows $220_1$ to $220_{10}$ in the case of the overall display of the layout and for each of the devices in the case of the zoom-in display. By touching the devices with a mouse, detailed data of the workload is shown by a pop-up window. In the pop-up window, the specification of the device, configuration and resource information can be displayed in accordance with the operation of a mouse or a keyboard.

Similarly, the power indication button 261 displays the power consumption distribution for each of the rack rows $220_1$ to $220_{10}$ and each of the devices, the output power or power supply loss of the electric transformer 240, the uninterruptible power supply system 241 and the power distribution panels $242_1$ to $242_4$ and the powers of the cooling tower 250, the chiller 251 and the air conditioners $252_1$ to $252_6$, and at the same time, the total power of the devices and facilities are displayed in numerical values. The temperature indication button 262 displays the temperature distribution of sensors dispersed in a room, the operating temperature of the devices, the intake/exhaust temperature of the rack rows $220_1$ to $220_{10}$, the supply/discharge air temperature of the air conditioners $252_1$ to $252_6$, the supply air temperature of the grille 253, the supply/discharge air temperature of refrigerant in the cooling tower 250 and the chiller 251 and the external air temperature. The failure indication button 263 displays a failure of the devices or facilities and further an alarm with respect to the operating temperature condition and admissibility workload condition of the devices and the admissibility power condition of the devices and facilities and its contents.

FIG. 3 is a layout diagram viewed in an xy plane, and its plane can be changed with the buttons 270 to 275. The button 270 specifies an xy plane display. The button 271 selects whether the xy plane is to be displayed along the entire z axis or the xy plane is to be cut out by specifying a particular z coordinate. The same goes for the buttons 272 to 275. Three-dimensional space information can be displayed by switching the button 270 for the xy plane, the button 272 for the yz plane and the button 274 for the zx plane. The buttons 280 and 281 are used for zoom-in display and zoom-out display, and the former indicates a detailed condition of the devices and facilities and the latter indicates an entire condition. In addition, three-dimensional display may be carried out if required for grasping the entire situation in a panoramic view.

In the layout information of the third embodiment, the operating situation of the devices and the environmental information of the facilities in a real space in which the devices and facilities are installed can be grasped collectively by visualization, and the workload allocation of the devices and the operation instruction for the facilities as described in the first embodiment and the second embodiment can be linked integrally and closely based on the layout information. Not only the energy saving operation for reducing the total power consumption of the devices and facilities but also operation monitoring, power control, business operation, failure detection and resource management of the devices and facilities can be handled collectively, and therefore, the work efficiency of an operation manager can be improved. Further, since the efficiency, risk and cost of both the devices and facilities of a current system can be diagnosed, its result can be used for planning and construction for moving, expansion, repair and updating of the system.

Fourth Embodiment

FIG. 4 is a numerical table showing operating information of information-processing devices in an operations management method of an information-processing system according to the fourth embodiment of the present invention, in which an example of a case where the information-processing device is a server is shown. The operating information of the server includes specification 300, configuration 310 and operating information (or measuring information, operating history) 320. For example, the operations management device as described in the first embodiment or the second embodiment has the specification 300, configuration 310 and operating information 320 of each device and manages them as the same data file or different data files correlated to one another. Note that the items, order and combination of the specification 300, configuration 310 and operating information 320 can be modified as required.

The specification 300 includes a device management number, administrator, device name, product name, model number, processing performance a, processing performance b, processing performance c, rated power (maximum), rated power (idle), rated temperature (maximum), rated temperature (minimum) and others. The configuration 310 includes a CPU model number, CPU maximum frequency, amount of CPUs, memory model number, memory capacity, amount of memories, chip set model number, disk model number, disk capacity, amount of disks, I/O transfer rate, number of I/Os and others. The operating information 320 includes device location coordinate, workload type, device/CPU state, CPU operating frequency, CPU utilization, CPU operating temperature, memory utilization, disk transfer rate, I/O transfer rate, device operating power, device intake temperature, device exhaust temperature and others.

In the fourth embodiment, a device power function as shown in expression 1 is derived based on the specification 300, the configuration 310 and the operating information 320. In a simple derivation method, for example, the device power function $p_{Di}$ (i=1, 2, ...) of the device i can be expressed as shown in expression 10 where the rated power (maximum) of the specification 300 is $p_{maxi}$, the rated power (minimum) is $p_{idlei}$, the CPU maximum frequency of the configuration 310 is $f_{max}$, the CPU operating frequency of the operating information 320 is $f_i$, CPU utilization is $\alpha_i$ and $f_i/f_{max} \cdot \alpha_i$ is set as a workload amount. If a plurality of the CPUs exist or the CPU has a plurality of cores, an average value between $f_i$ and $\alpha_i$ may be taken for simplification.

$$p_{Di} \cong (p_{maxi} - p_{idlei}) \cdot \frac{f_i}{f_{maxi}} \cdot \alpha_i + p_{idlei} \qquad \text{[Expression 10]}$$

If no workload exists or no workload is allocated, the device power function $p_{Di}$ of a device i is $p_{Di}=p_{idlei}$ according to the expression 10 by assuming that the CPU utilization $\alpha_i$ is 0%. If the device/CPU state of the operating information 320 has a sleep state or an idle state, the power $p_{Di}$ corresponding to each state under the CPU utilization $\alpha_i=0\%$ may be defined. Further, when it is assumed that a workload $f_i/f_{max} \cdot \alpha_i$ is being performed in a device i and a device power in the case where it is moved to a device j is estimated, the workload $f_i/f_{max} \cdot \alpha_i$ is replaced as shown in expression 11 where the device performance a of the specification 300 is $\gamma_a$, the device performance b is $\gamma_b$, the device performance c is $\gamma_c$ and the workload type of the operating information 320 is w (w=a, b, c), and it is substituted into the device power function $p_{Dj}$ of the device j.

$$\frac{f_i}{f_{maxi}} \cdot \alpha_i \rightarrow \frac{\gamma_{wi}}{\gamma_{wj}} \cdot \frac{f_i}{f_{maxi}} \cdot \alpha_i \qquad \text{[Expression 11]}$$

If the workload amount $\gamma_{wi}/\gamma_{wj} \cdot f_i/f_{max} \cdot \alpha_i$ after the replacement exceeds 100%, the power $p_{Dj}$ of the device j to which the workload is moved is assumed to be $p_{maxj}$ and it may be considered that the processing time of the workload is extended (power amount is increased) in accordance with the exceeding amount. Note that, although not particularly limited, the workload type is for identifying processing contents whose processing capacity is largely changed depending on hardware architecture not by CPU frequency simply, such as fixed-point arithmetic processing, floating-point arithmetic processing and memory read/write processing. Further, although not particularly limited, the device performance $\gamma_w$ is a bench mark score of each workload type.

Figure 5:
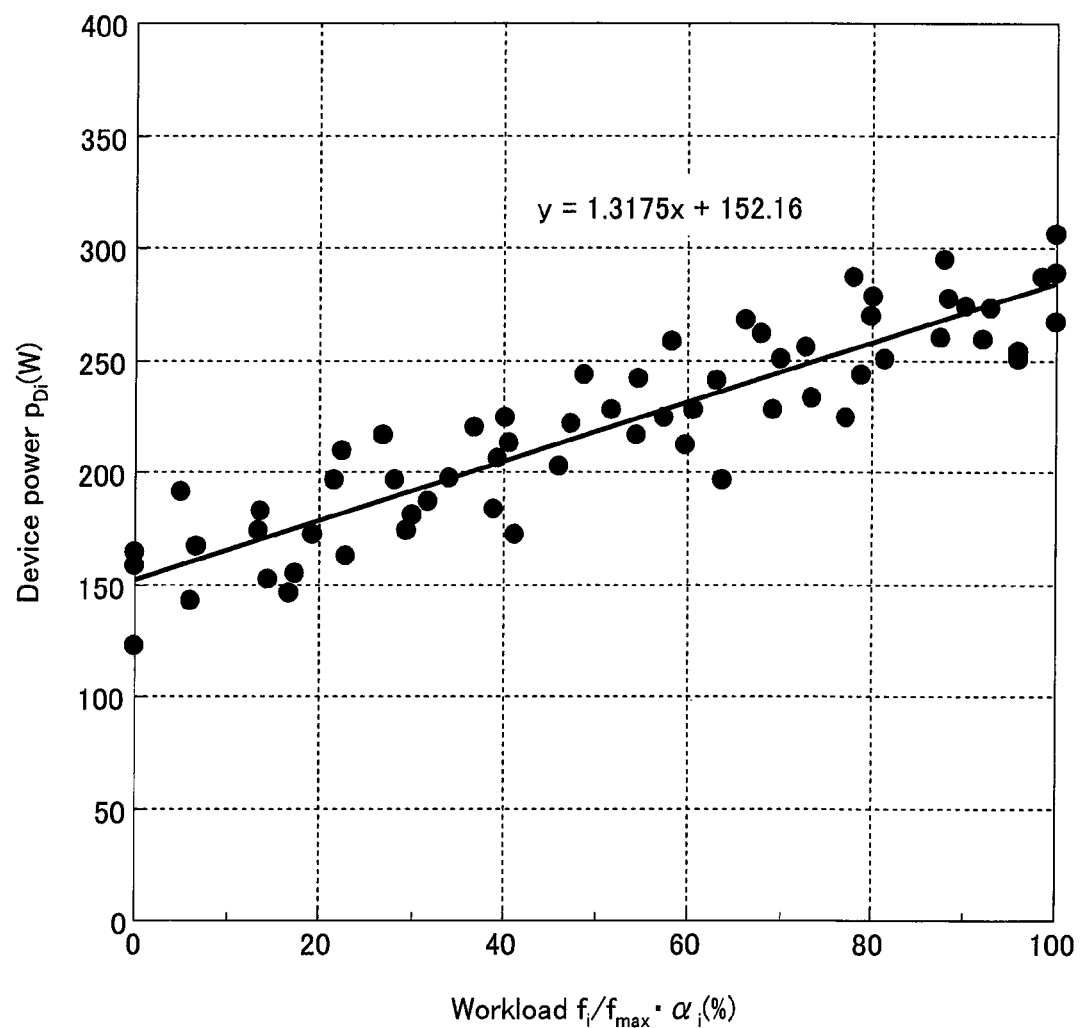
FIG. 5 is a graph showing a device power function in an operations management method of an information-processing system according to the fourth embodiment of the present invention.

When the device operating power of the operating information 320 can be obtained as existing measuring information or operating history, the approximate expression of the device power function $p_{Di}$ can be obtained from the data of the workload amount $f_i/f_{max} \cdot \alpha_i$ and the device operating power $p_{mensi}$. FIG. 5 shows an example in which these data are plotted and is a graph indicating approximated device power function $p_{Di}$. The function $p_{Di}$ can be expressed as shown in expression 12 where the slope of the linear function is $a_{Di}$ and the intercept is $b_{Di}$. In the example of FIG. 5, the solid line indicates an approximate function where $a_{Di}=1.3175$ and $b_{Di}=152.16$.

$$p_{Di} \cong a_{Di} \cdot \frac{f_i}{f_{maxi}} \cdot \alpha_i + b_{Di} \qquad \text{[Expression 12]}$$

Figure 6:
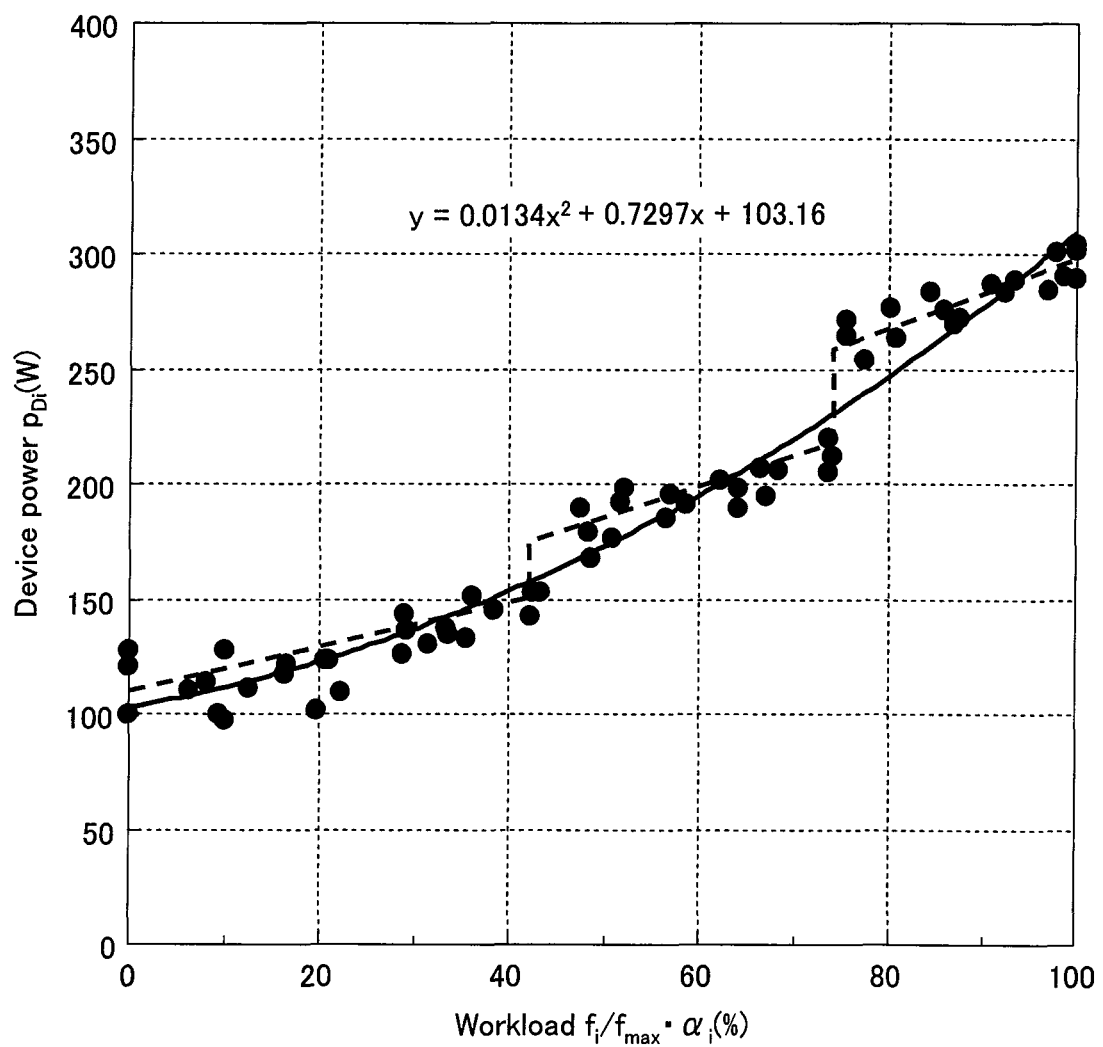
FIG. 6 is a graph showing a device power function in an operations management method of an information-processing system according to the fourth embodiment of the present invention.

When the device i executes demand-based switching of a plurality of operating states (CPU operating frequency, CPU core voltage) in accordance with the workload as an energy saving function, the device power $p_{Di}$ is changed in steps. In this case, by defining a linear function like expression 10 and expression 12 for each operating state and workload amount range, the device power function $p_{Di}$ can be expressed as a function set. As another simple method, the device power function $p_{Di}$ changed in steps can be approximated with a single quadratic function. FIG. 6 shows an example in which data of the workload amount $f_i/f_{max} \cdot \alpha_i$ and the device operating power $p_{measi}$ in the demand-based switching of the three states are plotted, and is a graph showing a secondarily approximated device power function $p_{Di}$. The function $p_{Di}$ can be expressed as shown in expression 13 where the coefficient of its secondary term is $a_{Di}$, the coefficient of the primary term is $b_{Di}$ and the constant term is $c_{Di}$. In the example of FIG. 6, the dotted line indicates a linear function changed in steps and the solid line indicates an approximated quadratic function, in which $a_{Di}$=0.0134, $b_{Di}$=0.7297 and $c_{Di}$=103.16.

$$p_{Di} \cong a_{Di} \cdot \left(\frac{f_i}{f_{maxi}} \cdot \alpha_i\right)^2 + b_{Di} \cdot \left(\frac{f_i}{f_{maxi}} \cdot \alpha_i\right) + c_{Di} \qquad \text{[Expression 13]}$$

When the device operating power $p_{measi}$ of the device i cannot be acquired directly and the thermal resistance and thermal time constant are evident, the operating power $p_{measi}$ can be derived indirectly from the intake temperature and the exhaust temperature of the operating information 320. The operating power $p_{measi}$ can be expressed as shown in expression 14 where the thermal resistance is $R_{thi}$, the thermal time constant is $\tau_{thi}$, the intake temperature is $T_{ini}$ and the exhaust temperature is $T_{outi}$. Since the temperature is changed slowly with the thermal time constant as compared with changes of the operating power, it is corrected in consideration of the slope of the temperature change.

$$p_{measi} \cong \frac{1}{R_{thi}} \cdot \left\{(T_{outi} - T_{ini}) + \tau_{thi} \cdot \frac{d(T_{outi} - T_{ini})}{dt}\right\} \qquad \text{[Expression 14]}$$

When the device operating power $p_{measi}$ is acquired indirectly, the device power function $p_{Di}$ as shown in expression 12 and expression 13 can be derived together with the measurement of $f_i/f_{max}\cdot\alpha_i$ of the workload amount. Also, even when the thermal resistance $R_{thi}$ and the thermal time constant $\tau_{thi}$ are not evident at the beginning, if the rated power (maximum) $p_{maxi}$ or the rated power (minimum) $p_{idlei}$ is known, the thermal resistance $R_{thi}$ and the thermal time constant $\tau_{thi}$ can be calculated from the measured data of the intake temperature $T_{ini}$ and the exhaust temperature $T_{outi}$ and the slope data of the temperature changes.

In the device power function of the fourth embodiment, the power consumption of the devices to a workload can be easily obtained and the relation between the workload amount and device power can be grasped with a good view, so that the workload allocation to the devices can be carried out efficiently. Further, even when all the operating information of the devices cannot be obtained, the device power function can be derived from a part of data as shown in expression 10 and expression 14, and if the measuring information and the operating history can be obtained, the device power function matched with an actual measurement can be derived as shown in expression 12 and expression 13. Furthermore, if the measuring information and operating history are accumulated, the approximation accuracy can be raised.

Although the server unit is exemplified in the fourth embodiment, the device power function can be derived from the device operating information similarly even in the case of the storage unit or the network unit. Although the CPU maximum frequency, the CPU operating frequency and the CPU utilization are used as main variables indicating the workload amount in the fourth embodiment, the number of activated disks, access pattern and access time can be used in the case of the storage unit, and the amount of transferred packets and switching frequency can be used in the case of the network unit.

Fifth Embodiment

Figure 7:
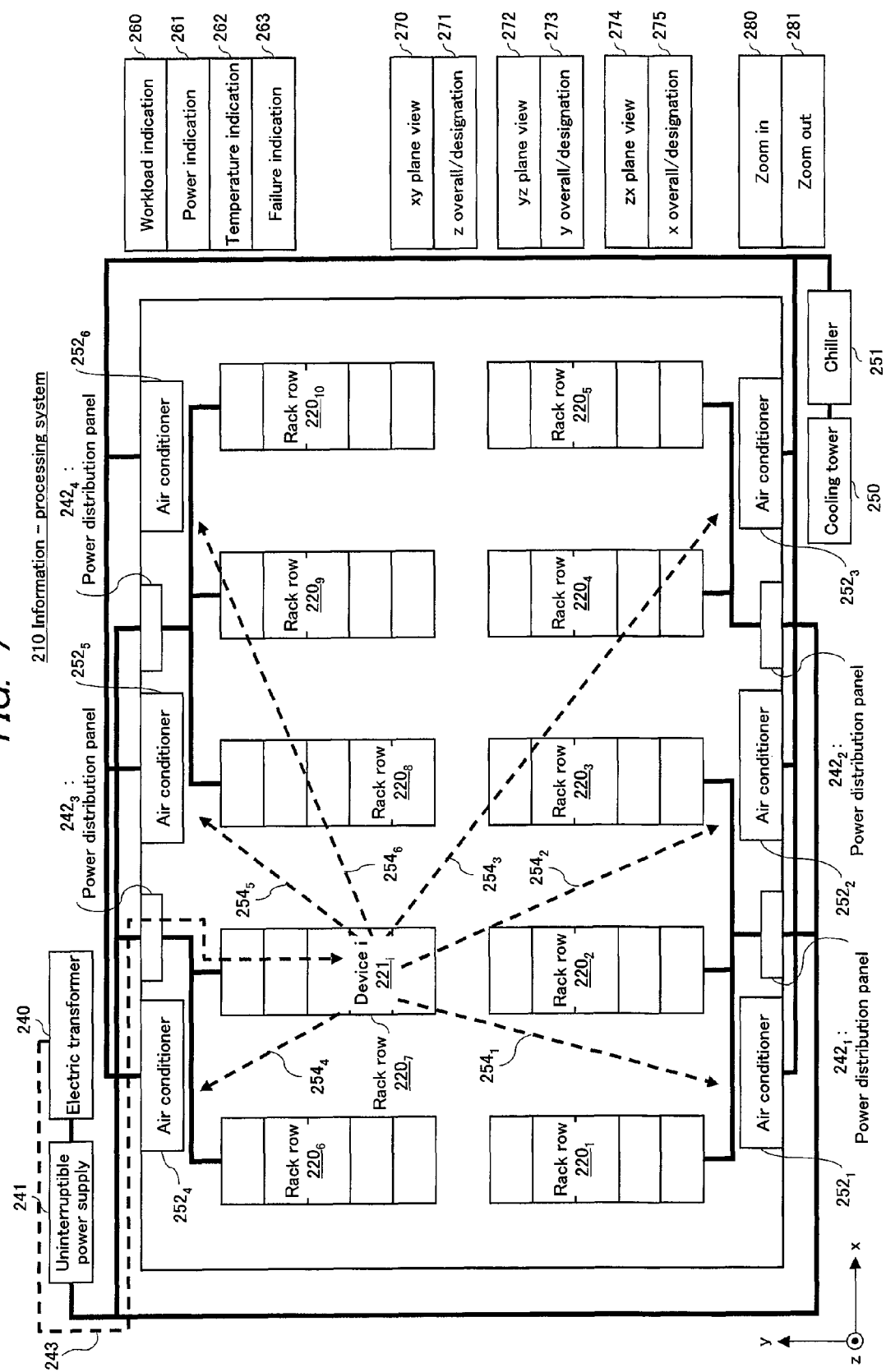
FIG. 7 is an explanatory diagram showing a facilities power function in an operations management method of an information-processing system according to the fifth embodiment of the present invention.

FIG. 7 is an explanatory diagram of the facilities power function in the operations management method of the information-processing system according to the fifth embodiment of the present invention, in which the information-processing system 210 of the third embodiment is used as an example. For example, when a device i 221$_i$ is located at a rack row 220$_7$, the power supply facility supplies power to the device i from the electric transformer 240 through the uninterruptible power supply system 241 and the power distribution panel 242$_3$ as shown with the arrow 243. Electric power consumed by the device i 221$_i$ is transformed to sensible heat to warm the air. The cooling facility supplies cooling air to the device i 221$_i$ from the air conditioners 252$_1$ to 252$_6$ through the under-floor and grille (in FIG. 7, illustration of the floor tiles and grilles is omitted to facilitate seeing), and air heated by the device i 221$_i$ is returned to the air conditioners 252$_1$ to 252$_6$ as shown with arrows 254$_1$ to 254$_6$, so that heat absorbed by the air conditioners 252$_1$ to 252$_6$ is discharged to the external air through the chiller 251 and the cooling tower 250.

If the location coordinates and the device power or device power function are known over the entire devices like the device i, the power supply loss of the power supply facilities and the cooling power of the cooling facilities can be calculated. If the location coordinate of the devices is obtained from the operating information 320 and the device power function as shown in expression 10, expression 12 and expression 13 is obtained like in the fourth embodiment, the power distribution of the entire devices can be obtained, and the facility power can be calculated with the facilities power functions $p_s$ and $p_c$ as shown in expressions 2 and 3 with using them as inputs. For the calculation of the facilities power functions $p_s$ and $p_c$, a simulator in which environmental information such as the location coordinate of the facility, connecting configuration and operating characteristic are inputted preliminarily can be used.

Further, in order to obtain the facility power simply, linear approximation is carried out within the range of a predetermined condition, thereby disassembling the facilities power functions $p_s$ and $p_c$ into the facilities element functions $p_{si}$ and $p_{ci}$ as shown in expressions 6 and 7. The facilities power functions $p_s$ and $p_c$ are liner sums of the element functions $p_{si}$ and $p_{ci}$ of each device over the entire devices. The element function $p_{si}$ of the power supply facility for the device i is obtained by performing a preliminary simulation along the power supply system indicated by an arrow 243. The element function $p_{ci}$ of the cooling facility is obtained by performing a preliminary simulation in consideration of influences of thermal load which the device i gives to the air conditioners 252$_1$ to 252$_6$ as shown by arrows 254$_1$ to 254$_6$. In the simulation, the sensitivity coefficient of the power supply/cooling facility power is calculated by changing the power to the device i. In the simplified case, the facilities element functions $p_{si}$ and $p_{ci}$ can be expressed with a linear function as shown in expressions 15 and 16 where the slopes are $a_{si}$ and $a_{ci}$ and the intercepts are $b_{si}$ and $b_{ci}$.

$$p_{Si} \cong a_{Si} p_{Di} + b_{Si} \qquad \text{[Expression 15]}$$

$$p_{Ci} \cong a_{Ci} p_{Di} + b_{Ci} \qquad \text{[Expression 16]}$$

If the facilities element functions $p_{si}$ and $p_{ci}$ are determined, the device function $p_i$ as shown in expression 8 can be derived by taking the sum with the device power function $p_{Di}$. The device function $p_i$ indicates a device power and facility power applied to each device. For example, if the device power function $p_{Di}$ shown in expression 12 described in the fourth embodiment is used, the device function $p_i$ can be expressed as shown in expression 17. The slope $a_i$ and intercept $b_i$ of the device function $p_i$ are defined newly. The total power consumption P of the devices and facilities is a total sum of the device functions $p_i$ of the entire devices, and the expression 9 can be rewritten into the expression 18.

$$p_i = p_{Di} + p_{Si} + p_{Ci} = a_i \cdot \left(\frac{f_i}{f_{maxi}} \cdot \alpha_i\right) + b_i \quad \text{[Expression 17]}$$

$$a_i = a_{Di} \cdot (1 + a_{Si} + a_{Ci})$$

$$b_i = b_{Di} \cdot (1 + a_{Si} + a_{Ci}) + b_{Si} + b_{Ci}$$

$$P = \sum_i p_i = \sum_i \left\{ a_i \cdot \left(\frac{f_i}{f_{maxi}} \cdot \alpha_i\right) + b_i \right\} \quad \text{[Expression 18]}$$

As is evident from the expression 18, by optimizing the allocation of the workloads ($f_i/f_{max} \cdot \alpha_i$) to the devices, the total power P of the devices and facilities can be minimized. More specifically, a combination optimization problem for allocating the workloads to the devices is solved so as to minimize the objective function P. Since the number of the combinations is enormous as shown in expression 5 if there are a number of the devices, it is not realistic to search all the combinations. In the fifth embodiment, since the objective function P of the expression 18 is turned into a linear sum of the linear functions by an appropriate approximation, an optimum solution can be found out efficiently with using the slope $a_i$ and the intercept $b_i$ of the device function $p_i$ as indexes.

Sixth Embodiment

Figure 8:
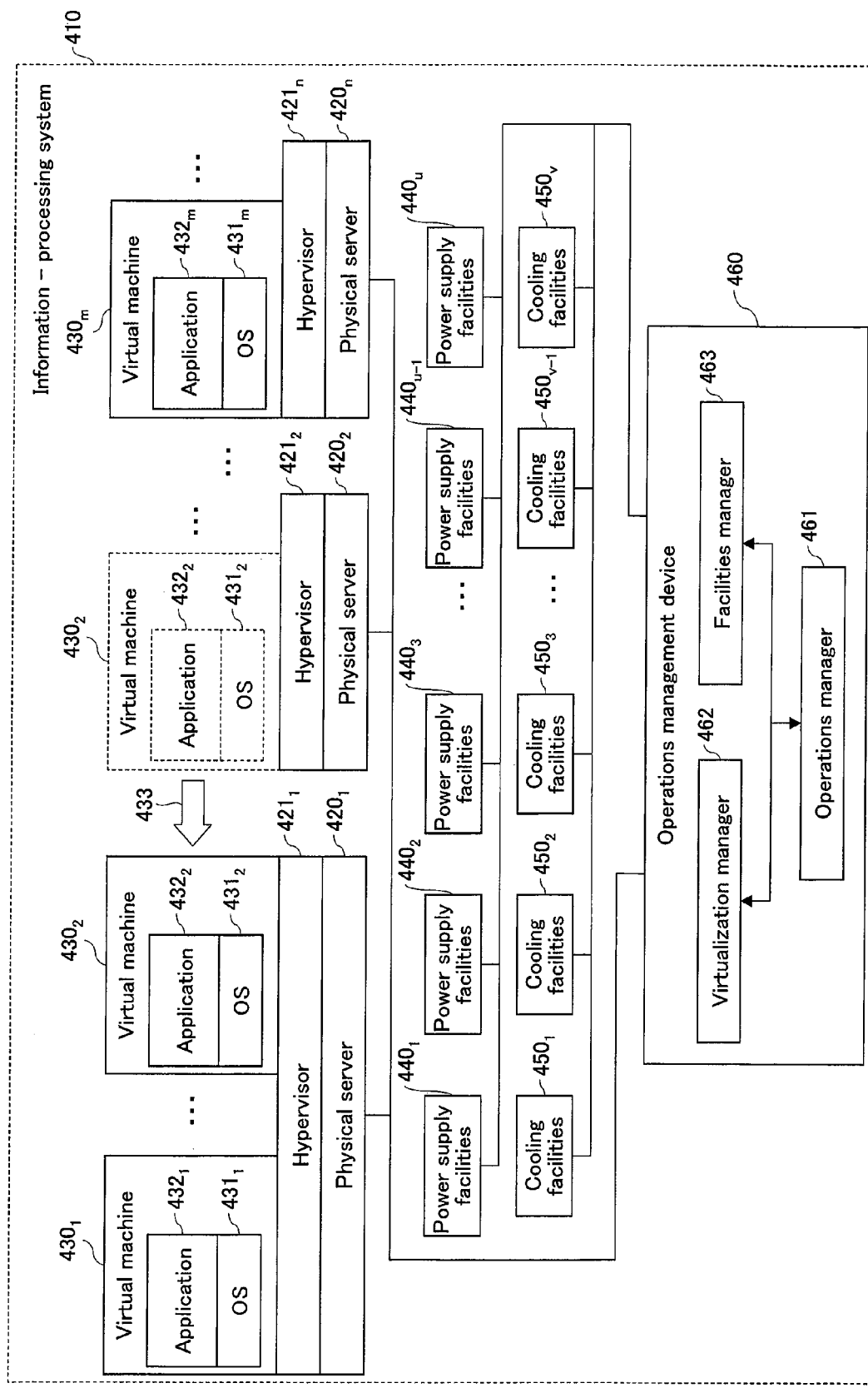
FIG. 8 is a configuration diagram showing an operations management device and an operations management method in an information-processing system according to the sixth embodiment of the present invention.

FIG. 8 is a configuration diagram showing the operations management device and operations management method of the information-processing system according to the sixth embodiment of the present invention. An information-processing system 410 includes physical servers $420_1$ to $420_n$, power supply facilities $440_1$ to $440_u$ for supplying power to the servers $420_1$ to $420_n$, cooling facilities $450_1$ to $450_v$ for cooling the servers $420_1$ to $420_n$ and an operations management device 460 for managing the servers $420_1$ to $420_n$ and the facilities $440_1$ to $440_u$ and $450_1$ to $450_v$, and a virtual environment is formed. Virtual machines $430_1$ to $430_m$ are disposed on the physical servers $420_1$ to $420_n$ via hypervisors $421_1$ to $421_n$, and OS $431_1$ to $431_m$ and applications $432_1$ to $432_m$ as the workloads are operated thereon. In the operations management device 460, a virtualization manager 462 for managing the physical servers $420_1$ to $420_n$ and the virtual machines $430_1$ to $430_m$, a facility manager 463 for managing the facilities $440_1$ to $440_u$ and $450_1$ to $450_v$ and an operations manager 461 for reducing the total power consumption of the servers $420_1$ to $420_n$ and the facilities $440_1$ to $440_u$ and $450_1$ to $450_v$ are operated in coordination.

In the sixth embodiment, the virtualization manager 462 manages allocation of the virtual machines $430_1$ to $430_m$ to the physical servers $420_1$ to $420_n$ and resource distribution (allocation of resources such as CPU and memory capacities) to the virtual machines $430_1$ to $430_m$ via the hypervisors $421_1$ to $421_n$, thereby acquiring the operating information of the virtual machines $430_1$ to $430_m$ and the physical servers $420_1$ to $420_n$ (for example, CPU utilization, memory capacity, disk transfer rate, network transfer rate and the like of the physical server, and CPU utilization, memory utilization, disk transfer rate, network transfer rate and the like of the virtual machine). Based on this operating information, the operations manager 461 estimates applications or the workloads $432_1$ to $432_m$ and derives a relation of the electric power of the physical servers $420_1$ to $420_n$ with respect to the workload. For example, in the case where a plurality of the virtual machines exist to a single physical server, if the overhead of the virtualization itself is small, it can be considered that the sum of the operation ratios or operation amounts of the plurality of the virtual machines is the operation ratio or operation amount of the physical server. For example, assuming the case where CPU of eight cores in total exists in the physical servers, two cores are distributed in the virtual machine A and six cores are distributed in the virtual machine B, the sum of the one-fourth of the CPU utilization of the virtual machine A and the three-fourths of the CPU utilization of the virtual machine B corresponds to the CPU utilization of the physical server, and the device power function can be expressed as shown in expressions 10, 12 and 13.

The facility manager 463 acquires the locations and environmental information of the facilities $440_1$ to $440_u$ and $450_1$ to $450_v$ to derive a relation of the facility power with respect to the power distribution of the physical servers $420_1$ to $420_n$. The operations manager 461 derives an optimum solution of the workload allocation to the physical servers based on the relation of the physical server power with respect to the workload and the relation of the facility power with respect to the power distribution of the physical servers. In accordance with this solution, the virtualization manager 462 allocates the virtual machines $430_1$ to $430_m$ equipped with the applications $432_1$ to $432_m$ to the physical servers $420_1$ to $420_n$. FIG. 8 shows an example where the application $432_2$ is moved from the physical server $420_2$ to $420_1$ together with the virtual machine $430_2$ as shown with arrow 433.

According to the sixth embodiment, by using the live migration function of the virtualization environment, the applications $432_1$ to $432_m$ can be moved between the physical servers $420_1$ to $420_n$ without stopping the operation thereof. Consequently, the workload allocation for minimizing the total power of the servers and facilities can be executed simply, and the overhead and time loss accompanied by the movement of the workload can be suppressed, so that energy saving of the information-processing system can be realized. The sixth embodiment is an example of server units, but energy saving operation can be achieved similarly in the virtualization environment of storage units and network units. Note that, although the sixth embodiment employs a method in which the operations manager 461, the virtualization manager 462 and the facility manager 463 cooperate with one another, any one of them may be incorporated in the other in accordance with the interface or the software size.

Seventh Embodiment

Figure 9:
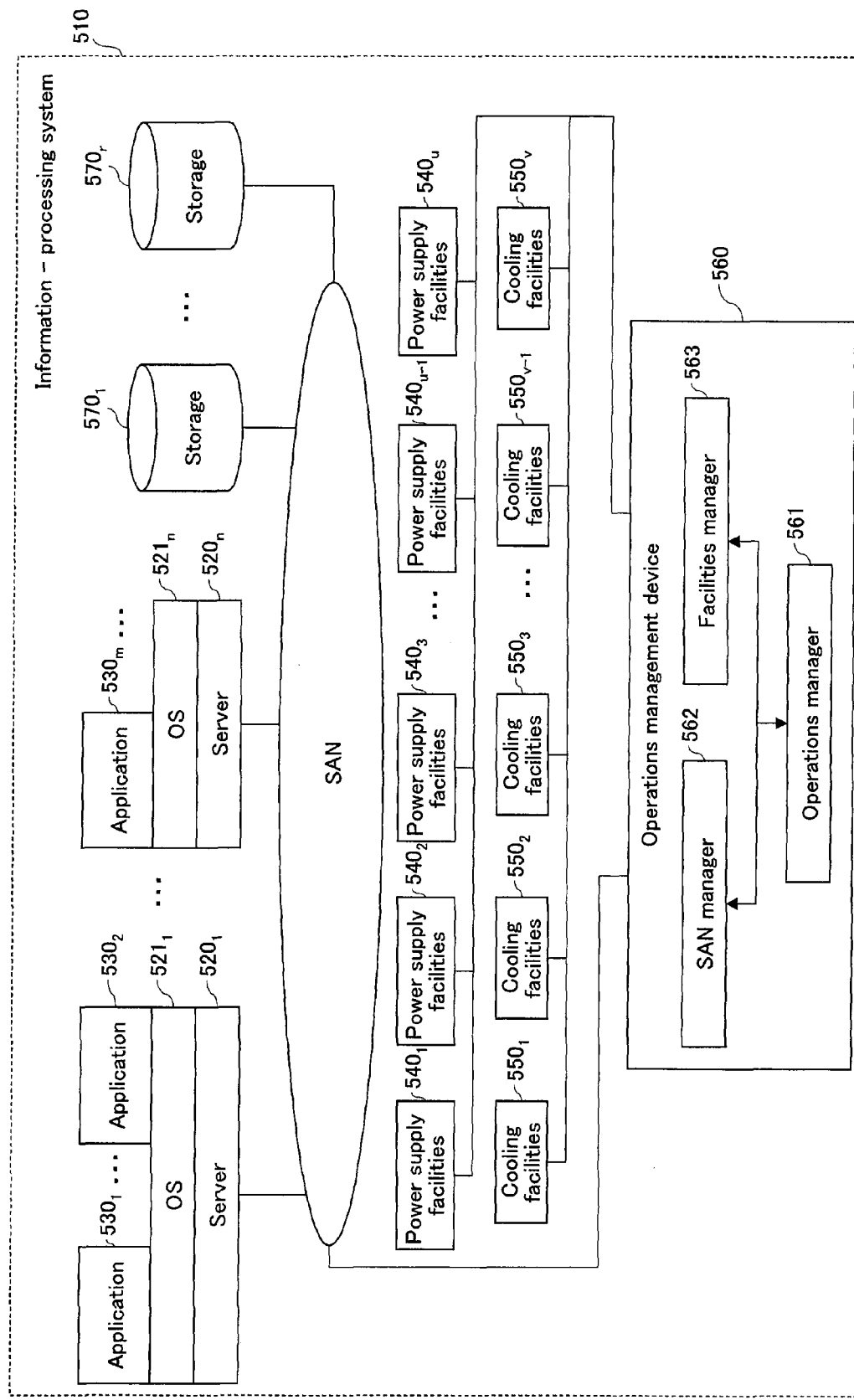
FIG. 9 is a configuration diagram showing an operations management device and an operations management method in an information-processing system according to the seventh embodiment of the present invention.

FIG. 9 is a configuration diagram showing the operations management device and operations management method of the information-processing system according to the seventh embodiment of the present invention. The information-processing system 510 includes servers $520_1$ to $520_n$, storages $570_1$ to $570_r$, power supply facilities $540_1$ to $540_u$ and cooling facilities $550_1$ to $550_v$ for supplying power to the servers and storages and cooling the same, and an operations management device 560 for managing these devices and facilities, and storage area network (SAN) environment is formed. In the servers $520_1$ to $520_n$, applications $530_1$ to $530_m$ as the workloads are operated on OS $521_1$ to $521_n$. In the operations management device 560, a SAN manager 562 for managing the SAN constituted of the servers $520_1$ to $520_n$ and the storages $570_1$ to $570_r$, a facility manager 563 for managing the facilities $540_1$ to $540_u$ and $550_1$ to $550_v$ and an operations manager 561 for reducing the total power consumption of the servers $520_1$ to $520_n$, storages $570_1$ to $570_r$ and facilities $540_1$ to $540_u$ and $550_1$ to $550_v$ are operated in coordination.

In the seventh embodiment, the SAN manager 562 monitors and manages the operations of the severs $520_1$ to $520_n$, and the operations manager 561 evaluates power of the severs $520_1$ to $520_n$ with respect to the applications or the workloads $530_1$ to $530_m$. The facility manager 563 obtains a facility power with respect to the power distribution of the servers $520_1$ to $520_n$ based on the locations and environmental information of the facilities $540_1$ to $540_u$ and $550_1$ to $550_v$. The operations manager 561 obtains a workload allocation to minimize the total power of the servers and facilities based on the relation between the server power distribution and the facility power. In accordance with this solution, the SAN manager 562 temporarily interrupts the current applications $530_1$ to $530_m$ and withdraws to the storages $570_1$ to $570_r$, and then starts up the servers $520_1$ to $520_n$ having allocations by SAN boot so as to continue the applications $530_1$ to $530_m$. Of the servers $520_1$ to $520_n$, servers having no allocation are stopped and powered off. Note that, in the execution of the workload allocation, timings of activation/interruption/stop of the applications $530_1$ to $530_m$ have to be sufficiently considered.

According to the seventh embodiment, by using the SAN boot function, energy saving operation for minimizing the total power of the servers and facilities can be carried out. There is an advantage that this embodiment can be introduced easily to an existing system or the case where the virtualization environment is not prepared completely like the sixth embodiment. Also, the further energy saving can be achieved by employing this embodiment together with the storages $570_1$ to $570_r$ in addition to the servers and facilities.

Eight Embodiment

Figure 10:
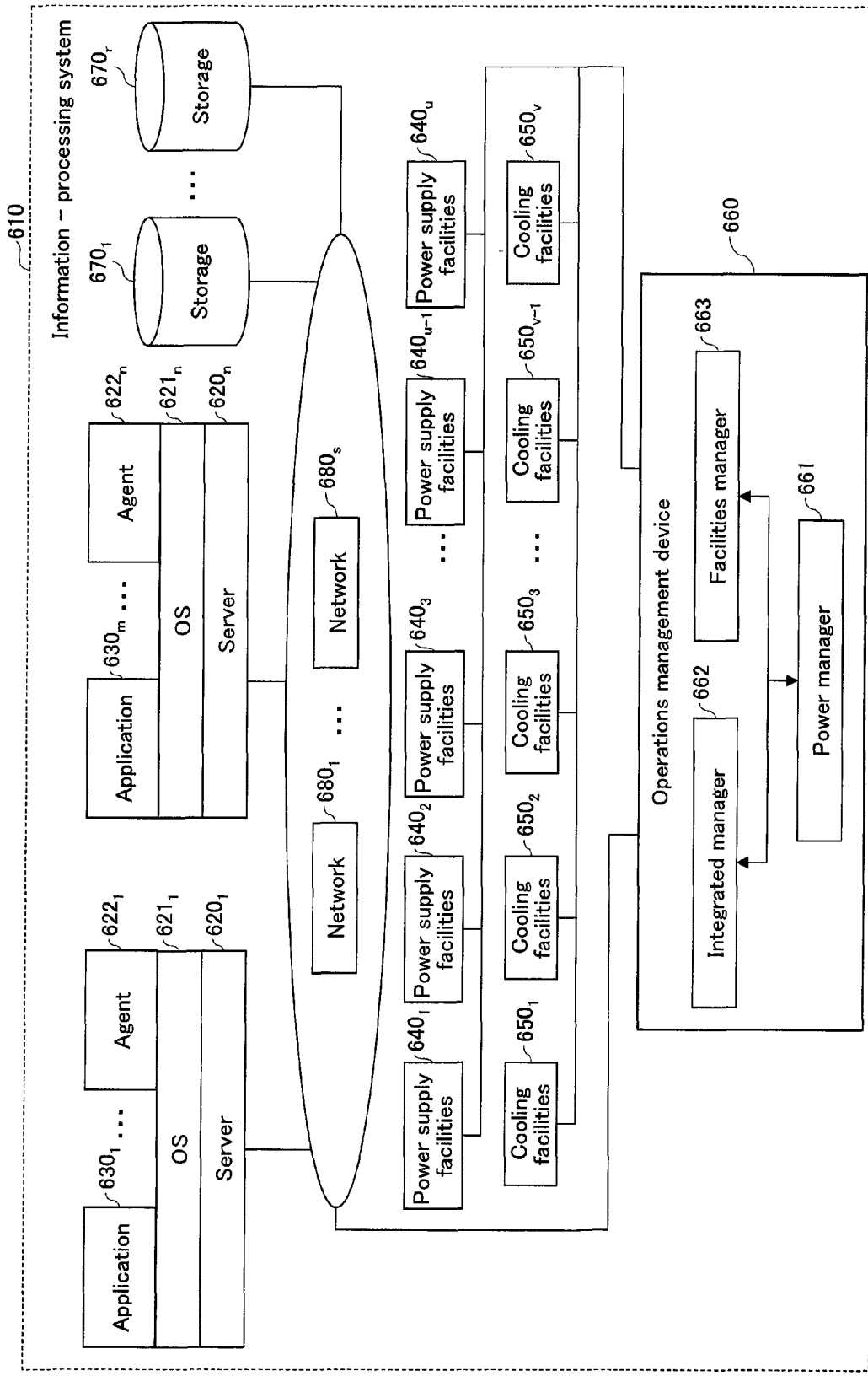
FIG. 10 is a configuration diagram showing an operations management device and an operations management method in an information-processing system according to the eighth embodiment of the present invention.

FIG. 10 is a configuration diagram showing the operations management device and operations management method of the information-processing system according to the eighth embodiment of the present invention. The information-processing system 610 includes servers $620_1$ to $620_n$, storages $670_1$ to $670_r$, networks $680_1$ to $680_s$, power supply facilities $640_1$ to $640_u$ and cooling facilities $650_1$ to $650_v$ for supplying power to the servers, storages and networks and cooling the same, and an operations management device 660 for integrally managing the devices and facilities, and an integral management environment is formed. In the servers $620_1$ to $620_n$, applications $630_1$ to $630_m$ and integral management agents $622_1$ to $622_n$ as the workloads are operated on OS $621_1$ to $621_n$. In the operations management device 660, a manager 662 for integrally managing the servers $620_1$ to $620_n$, the storages $670_1$ to $670_r$ and the networks $680_1$ to $680_s$, a facility manager 663 for managing the facilities $640_1$ to $640_u$ and $650_1$ to $650_v$ and a power manager 661 for reducing the total power consumption of the devices $620_1$ to $620_n$, $670_1$ to $670_r$ and $680_1$ to $680_s$ and the facilities $640_1$ to $640_u$ and $650_1$ to $650_v$ are operated in coordination.

In the eighth embodiment, the integrated manager 662 carries out operations management and business operation of the servers $620_1$ to $620_n$ via the agents $622_1$ to $622_n$, the power manager 661 estimates power of the servers $620_1$ to $620_n$ for the applications $630_1$ to $630_m$, and the facility manager 663 estimates power of the facilities $640_1$ to $640_u$ and $650_1$ to $650_v$. The power manager 661 obtains a workload allocation in cooperation with the facility manager 663, and the integrated manager 662 starts and stops the servers $620_1$ to $620_n$ based thereon so as to change over a server which operates the applications $630_1$ to $630_m$. In job scheduling, the workloads can be allocated by the arrangement for inputting jobs (applications) $630_1$ to $630_m$ to the servers $620_1$ to $620_n$.

Figure 11:
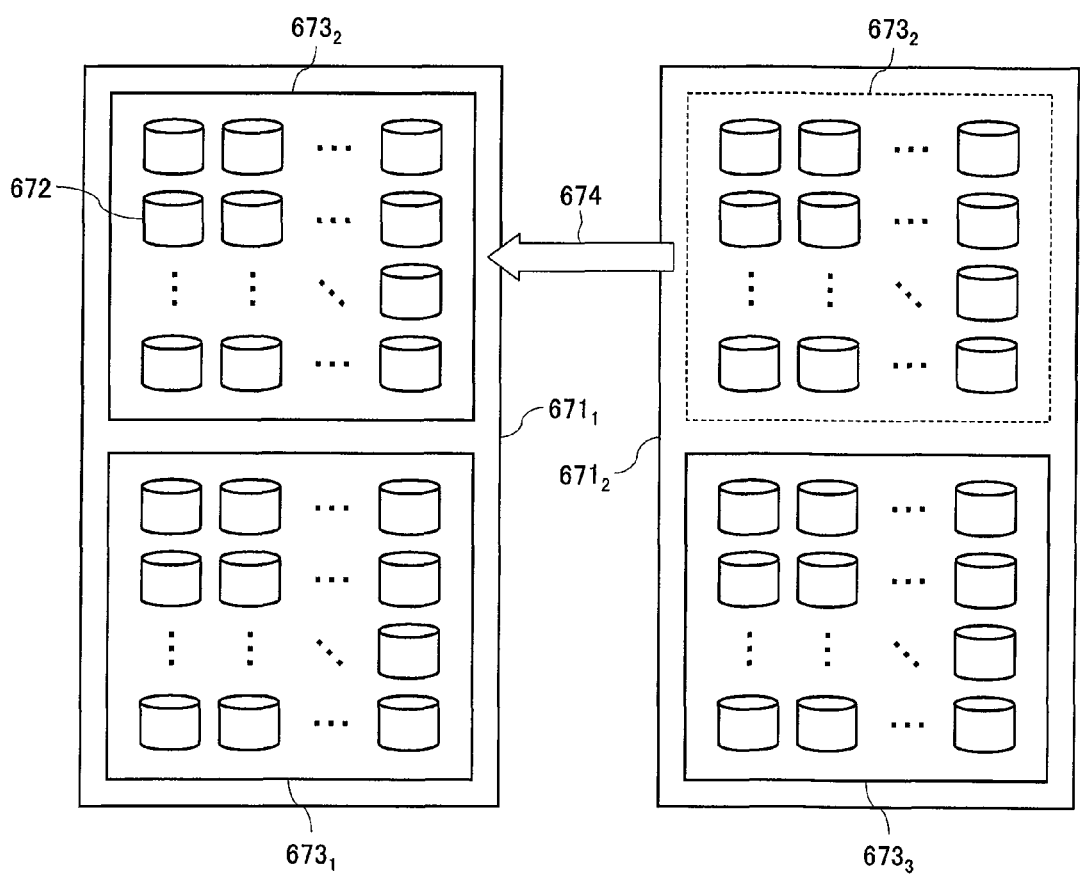
FIG. 11 is an explanatory diagram showing an operations management method in an information-processing system according to the eighth embodiment of the present invention.
Figure 12:
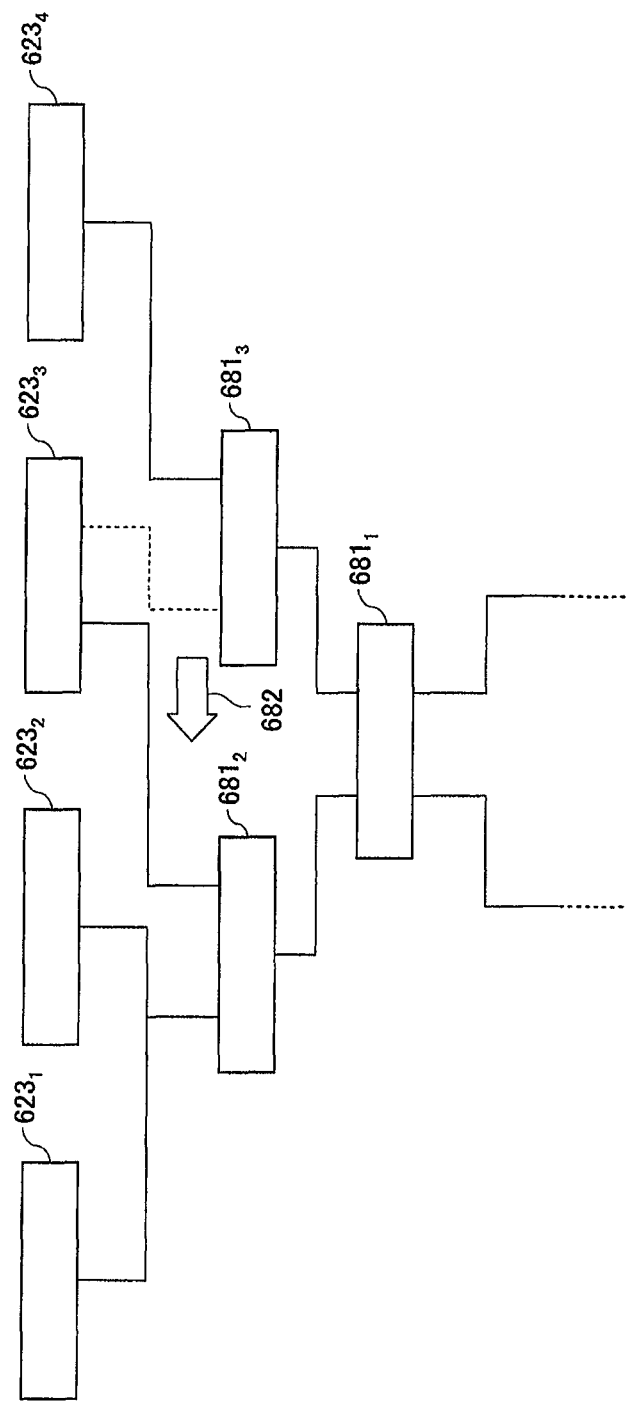
FIG. 12 is an explanatory diagram showing an operations management method in an information-processing system according to the eighth embodiment of the present invention.

The operations management of the storages $670_1$ to $670_r$ and the networks $680_1$ to $680_3$ can be performed in the same manner as that of the servers $620_1$ to $620_n$. FIG. 11 is an explanatory diagram showing an example of the storages, and FIG. 12 is an explanatory diagram showing an example of the networks. In FIG. 11, the storage units $671_1$ and $671_2$ are constituted of disk arrays 672 and store data $673_1$ to $673_3$. By moving or copying data $673_2$ having a high access frequency which is a workload from the storage unit $671_2$ to $671_1$ as indicated with arrow 674, a desired workload allocation can be carried out. In FIG. 12, server units $623_1$ to $623_4$ are connected to network units $681_1$ to $681_3$, and the workload is moved by changing a connection to the server unit $623_3$ from the network unit $681_3$ to $681_2$ as indicated with arrow 682. After the workload allocation is changed, the storage units $671_1$ and $671_2$ and the network units $681_1$ to $681_3$ control the power supply by activating their energy saving functions. Note that, in the movement of the workload, it is important to sufficiently consider a processing time, overhead of power and a risk accompanied by the processing in both the storages and networks.

According to the eight embodiment, the servers, storages and network units can be managed integrally by the operations management and jog scheduling, and the total power consumption of all the devices and facilities can be minimized. By combining such functions as the policy operation, resource management, failure monitoring, power management and integrated console possessed by the integrated manager 662 with the energy saving function of the power manager 661, a more advanced and flexible system operation can be achieved. Note that the power manager 661 and the facility manager 663 can be installed as a part or a subsystem of the integrated manager 662.

The major effects achieved by the operations management device and the operations management method of the information-processing system according to the embodiments described above are as follows.

By the means of the above-described embodiments, the total power consumption of the devices and facilities can be reduced by the operations management in which the information-processing devices and the facilities are operated in coordination. Thus, energy saving operation of the information-processing system like a data center can be achieved, and the operating cost can be reduced and excessive investment to facilities can be suppressed. Accordingly, it is possible to contribute to the prevention of global warming and reduction of carbon dioxide.

The means of the above-described respective embodiments pays attention to electric power of the devices and facilities. However, by introducing the hourly average and time integration regarding the workload of the devices, operating information and environmental information of the facilities, optimization of the workload in consideration of the processing time can be achieved easily, and the electric energy (electric power×time=energy) of the devices and facilities can be reduced. Further, in the allocation of the workloads to the devices, by taking into consideration the processing priority order of the workloads, the execution timing in a plan or an event and the electric cost in accordance with electric transmission system and charging system as well as the electric power and electric energy, the respective embodiments can be applied as a policy operation with improved benefit and convenience.

The present embodiments are preferable for an autonomous energy saving operations management method of the information-processing system itself. Further, the solutions of workload allocation and the measurement results of individual electric power and total electric power of the devices and facilities obtained by the embodiments provide a useful operations management policy also in energy saving diagnosis and improvement in an existing system, planning and adjustment in design and construction of a new system and expansion, moving, repair and updating of the devices and facilities, risk management and cost calculation for a future information processing foresight, and operation management and scenario establishment by manpower.

In the foregoing, the invention made by the inventors of the present invention has been concretely described based on the embodiments. However, it is needless to say that the present invention is not limited to the foregoing embodiments and various modifications and alterations can be made within the scope of the present invention.

The present embodiments can be applied to integrated energy saving operations management in the information-processing system constituted of the information-processing devices including the servers, storages and networks, the power supply facilities and the cooling facilities, and are preferable particularly to the data center which bears an information-processing foundation. Further, the present embodiments are not only used for autonomous operations management of the information-processing system but also used for wide variety of applications as a system establishing tool, energy saving diagnostic tool, operation monitoring tool and auxiliary tool for an operation manager and facility manager.

Further, the present embodiments can be applied to plural places as well as the devices and facilities arranged at a place. For example, the present embodiments are useful also for a data center arranged across multiple floors or data centers separated globally, and can be used for the case where the information-processing devices and facilities are dispersed like in the grid computing and cloud computing. Further, although the present embodiments are mainly directed to the information-processing devices and facilities, the present embodiments can be applied to devices which consume electric power or energy and related facilities thereof. For example, the present embodiments exert beneficial effects on the operation and control of electric devices, mechanical devices, driving devices, thermal devices and the like, and can contribute to the power saving and energy saving in any system scales such as the electronic components and power supply or cooling device, the information-processing modules and power supply unit or cooling unit, and the data centers and power plant or cooling environment including a site location.

What is claimed is:

1. An operations management method in a system including an operations management device having a processor and a memory device, a plurality of devices which consume electric power or energy, and a plurality of facilities for supplying power to and/or for cooling of the devices, the operations management method comprising the steps of:
acquiring, by the operations management device, locations of the devices, locations of the facilities, and environmental information of the facilities;
obtaining, by the operations management device, a plurality of combinations of allocations of workloads to be executed by the devices based on the locations of the devices;
calculating, by the operations management device, power consumptions of the respective devices with regard to each of the plurality of combinations of allocations of workloads to be executed by the devices based on a function or a numerical table of the power consumptions of the respective devices with regard to amounts of workloads to be executed by the respective devices;
calculating, by the operations management device, power consumptions of the facilities necessary for each of the combinations based on the power consumptions of the respective devices, the locations of the devices, the locations of the facilities, and the environmental information of the facilities;
selecting, by the operations management device, one of the combinations of allocations of workloads based on a solution of a combinational optimization problem, which minimizes the power consumption of the system, including the calculated power consumptions of the respective devices, calculated in the step of calculating power consumptions of the respective devices, and the calculated power consumption of the facilities, calculated in the step of calculating power consumption of the facilities; and
allocating, by the operations management device, the workloads to the devices according to the one selected combination of allocations of workloads.

2. The operations management method in the system according to claim 1,
wherein the facilities carry out the cooling of the devices by heat exchange in a case where the system includes the facilities for cooling.

3. The operations management method in system according to claim 1,
wherein the facilities include a plurality of air conditioners in a case where the system includes the facilities for cooling.

4. An operations management method in a system including an operations management device having a processor and a memory device, a plurality of devices which consume electric power or energy, and a plurality of facilities for supplying power to and/or for cooling of the devices, the operations management method comprising the steps of:
acquiring, by the operations management device, locations of the devices, locations of the facilities and environmental information of the facilities;
obtaining, by the operations management device, a plurality of combinations of allocations of workloads to be executed by the devices based on the locations of the devices;
calculating, by the operations management device, power consumptions of the respective devices with regard to each of the plurality of combinations of allocations of workloads to be executed by the devices based on a function or a numerical table of the power consumptions of the respective devices with regard to amounts of workloads to be executed by the respective devices;
calculating, by the operations management device, power consumptions of the facilities necessary for each of the combinations based on the power consumptions of the respective devices, the locations of the devices, the locations of the facilities and the environmental information of the facilities;

selecting, by the operations management device, one of the combinations of allocations of workloads that minimizes the power consumption of the system by comparing power consumptions of the system including the calculated power consumptions of the respective devices calculated in the step of calculating power consumptions of the respective devices, and the calculated power consumption of the facilities among the combinations calculated in the step of calculating power consumption of the facilities; and allocating the workloads to the devices according to the one selected combination of allocations of workloads.

5. The operations management method in the system according to claim 4, wherein the facilities carry out the cooling of the devices by heat exchange in a case where the system includes the facilities for cooling.

6. The operations management method in the system according to claim 4, wherein the facilities include a plurality of air conditioners in a case where the system includes the facilities for cooling.

7. A system comprising:

a plurality of devices which consume electrical power or energy;

a plurality of facilities for supplying power to and/or for cooling the devices; and an operation management device comprising:

one or more processors and one or more memory devices storing instructions that cause the processors to execute:

an information acquisition unit configured to acquire locations of the devices, locations of the facilities and environmental information of the facilities, a workload allocation unit configured to obtain a plurality of combinations of allocations of workloads to be executed by devices based on the locations of the devices, a device power consumption calculating unit configured to calculate power consumptions of the respective devices with regard to each of the plurality of combinations of allocations of workloads to be executed by the devices based on a function or a numerical table of the power consumptions of the respective devices with regard to amounts of workloads to be executed by the respective devices, and a facilities power consumption calculating unit configured to calculate power consumptions of the facilities necessary for each of the combinations based on the power consumptions of the respective devices, the locations of the devices, the locations of the facilities and the environmental information of the facilities, wherein the workload allocation unit is further configured to select one of the combinations of allocations of workloads based on a solution of a combinational optimization problem, which minimizes the power consumption of the system including the calculated power consumptions of the respective devices calculated by the device power consumption calculating unit, and the power consumption of the facilities calculated by the facilities power consumption calculating unit, and wherein the workload allocation unit is further configured to allocate the workloads to the devices according to the one selected combination of allocations of workloads.

8. The system according to claim 7, wherein the system includes the facilities for cooling, and the facilities carry out the cooling of the devices by heat exchange.

9. The system according to claim 7, wherein the system includes the facilities for cooling, and the facilities include a plurality of air conditioners.

* * * * *